United States Patent [19]
Yasui et al.

[11] Patent Number: 5,924,281
[45] Date of Patent: Jul. 20, 1999

[54] AIR-FUEL RATIO CONTROL SYSTEM FOR INTERNAL COMBUSTION ENGINES

[75] Inventors: Yuji Yasui; Shusuke Akazaki; Kohei Hanada, all of Wako, Japan

[73] Assignee: Honda Giken Kogyo Kabushiki Kaisha, Tokyo, Japan

[21] Appl. No.: 08/835,192

[22] Filed: Apr. 4, 1997

[30] Foreign Application Priority Data

Apr. 5, 1996 [JP] Japan .................................. 8-084048

[51] Int. Cl.$^6$ ...................................................... F01N 3/00
[52] U.S. Cl. .............................. 60/276; 60/285; 123/674; 123/679
[58] Field of Search .................... 60/276, 285; 123/674, 123/679, 493

[56] References Cited

U.S. PATENT DOCUMENTS

| | | | |
|---|---|---|---|
| 4,508,086 | 4/1985 | Ito et al. ................................. | 123/493 |
| 4,858,136 | 8/1989 | Tanaka et al. ........................... | 123/493 |
| 5,377,484 | 1/1995 | Shimizu .................................. | 60/276 |
| 5,678,402 | 10/1997 | Kitagawa et al. ....................... | 60/276 |
| 5,758,490 | 6/1998 | Maki et al. .............................. | 60/285 |

FOREIGN PATENT DOCUMENTS

| | | |
|---|---|---|
| 5-79374 | 3/1993 | Japan . |
| 5-321721 | 12/1993 | Japan . |
| 7-83094 | 3/1995 | Japan . |
| 8-21273 | 1/1996 | Japan . |
| 8-105345 | 4/1996 | Japan . |

Primary Examiner—Thomas E. Denion
Attorney, Agent, or Firm—Nikaido, Marmelstein, Murray & Oram LLP

[57] ABSTRACT

An air-fuel control system for use with an internal combustion engine has a catalytic converter disposed in an exhaust system of the engine, for purifying an exhaust gas emitted from the engine, a first exhaust gas sensor in the exhaust system for detecting an air-fuel ratio of the exhaust gas upstream of the catalytic converter, a second exhaust gas sensor in the exhaust system for detecting the concentration of a component of the exhaust gas which has passed through the catalytic converter, downstream of the catalytic converter, and a correction quantity calculator for determining a correction quantity to correct an air-fuel ratio of the engine based on an output from the second exhaust gas sensor so as to equalize the concentration of the component of the exhaust gas downstream of the catalytic converter to a predetermined appropriate value. The air-fuel ratio of the engine is controlled based on the determined correction quantity and an output from the first exhaust gas sensor so as to converge the concentration of the component toward the predetermined appropriate value. A state predictor estimates the concentration of the component, detected by the second exhaust gas sensor, after a dead time present in an exhaust system including the catalytic converter between the first and second exhaust gas sensors, based on outputs up to present from the first and second exhaust gas sensors. The correction quantity calculator determines the air-fuel ratio of the engine so as to equalize the concentration of the component to the predetermined appropriate value, based on the estimated concentration of the component.

20 Claims, 18 Drawing Sheets

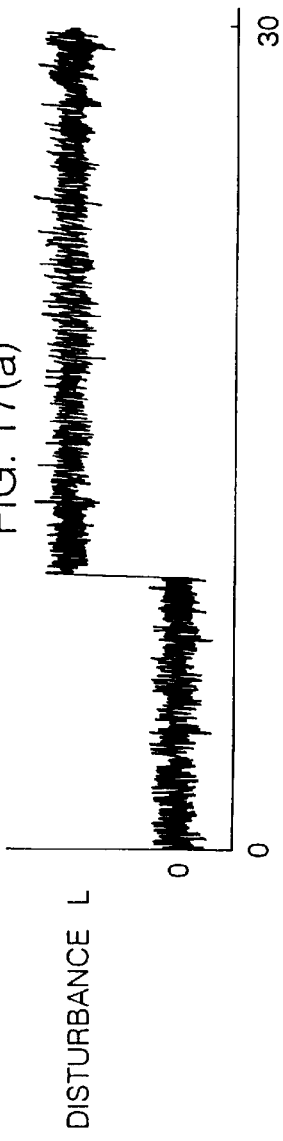
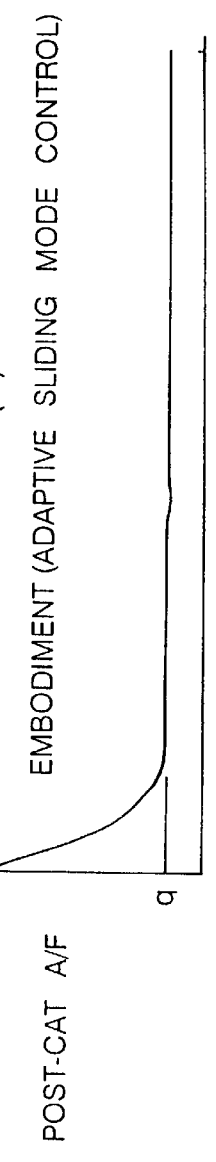
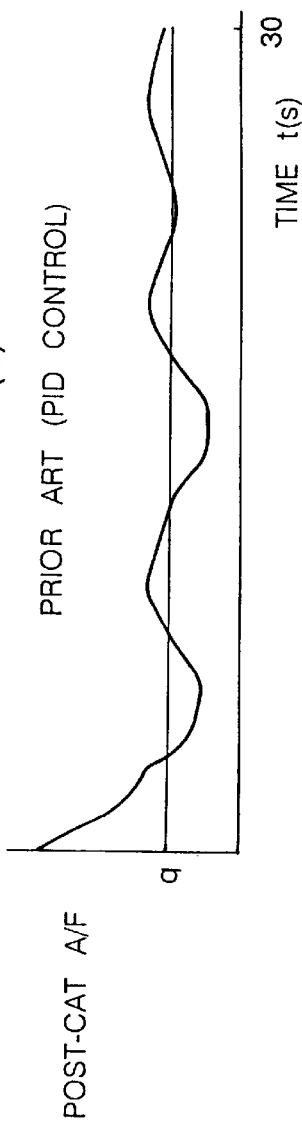
FIG. 17(a) DISTURBANCE L
FIG. 17(b) EMBODIMENT (ADAPTIVE SLIDING MODE CONTROL) POST-CAT A/F
FIG. 17(c) PRIOR ART (PID CONTROL) POST-CAT A/F

AIR-FUEL RATIO CONTROL SYSTEM FOR INTERNAL COMBUSTION ENGINES

BACKGROUND OF THE INVENTION

1. Field of the Invention

The present invention relates to a system for controlling the air-fuel ratio of an internal combustion engine.

2. Description of the Prior Art

It is desirable from the standpoint of environmental protection that systems for purifying an exhaust gas emitted from internal combustion engines on automobiles, for example, with a catalytic converter and discharging a purified exhaust gas control the air-fuel ratio of an exhaust gas emitted from an internal combustion engine at an appropriate air-fuel ratio which allows the catalytic converter to have a better ability to purify an exhaust gas.

One conventional air-fuel ratio control system combined with an internal combustion engine has been disclosed in Japanese laid-open patent publication No. 5-321721 which corresponds to U.S. Pat. No. 5,426,935.

The disclosed air-fuel ratio control system has an exhaust gas sensor (air-fuel ratio sensor) disposed in the exhaust system of the internal combustion engine for detecting the air-fuel ratio of an exhaust gas upstream of a catalytic converter, and another exhaust gas sensor (oxygen concentration sensor) disposed in the exhaust system for detecting the concentration of a certain component of the exhaust gas that has passed through the catalytic converter, e.g., the concentration of oxygen (which is commensurate with the air-fuel ratio of the exhaust gas that has passed through the catalytic converter), downstream of the catalytic converter. A basic air-fuel ratio for an air-fuel mixture upstream of the catalytic converter is established depending on the intake pressure and rotational speed of the internal combustion engine. The basic air-fuel ratio is corrected by a PID (proportional plus integral plus derivative) control process such that the oxygen concentration (air-fuel ratio) detected by the exhaust gas sensor down-stream of the catalytic converter will be of an appropriate value, thereby determining a target air-fuel ratio upstream of the catalytic converter. The rate of fuel supplied to the internal combustion engine is feedback-controlled according to the PID control process or an adaptive control process so as to cause the air-fuel ratio detected by the exhaust gas sensor upstream of the catalytic converter to converge toward the determined target air-fuel ratio. In this manner, the air-fuel ratio of the exhaust gas upstream of the catalytic converter is controlled within an appropriate range (window) which enables the catalytic converter to have a good purifying ability, thereby increasing the purifying ability of the catalytic converter.

As a result of various studies made by the inventors, it has been found that in order to keep the catalytic converter effective to purify the exhaust gas regardless of aging thereof, it is necessary to adjust the concentration of a certain component, e.g., the concentration of oxygen, of the exhaust gas downstream of the catalytic converter to a predetermined adequate value with high accuracy.

In the above conventional air-fuel ratio control system, however, since the basic air-fuel ratio upstream of the catalytic converter is corrected by the PID control process to determine a target air-fuel ratio in order to equalize the oxygen concentration detected by the exhaust gas sensor downstream of the catalytic converter to an appropriate value, it is difficult to adjust the oxygen concentration (air-fuel ratio) of the exhaust gas downstream of the catalytic converter highly accurately to an adequate value because of disturbances acting on the exhaust gas sensors and a dead time present in the exhaust system of the internal combustion engine. Particularly, the dead time present in the exhaust system including the catalytic converter has been a large obstacle to the above control process because the dead time is generally long.

Therefore, there has been a demand for a control process capable of eliminating effects of the dead time which is present in the exhaust system including the catalytic converter.

The inventors have attempted to determine a correction quantity for correcting the air-fuel ratio of the internal combustion engine in a sliding mode control process according to the modern control technology for eliminating effects of disturbances, etc.

The sliding mode control process is a feedback control process of variable structure. According to the sliding mode control process, a hyperplane (see FIG. 7 of the accompanying drawings) expressed by a linear function which has as its variables a plurality of state quantities of an object to be controlled is defined in advance, and the state quantities are converged onto the hyperplane under high-gain control. Furthermore, while the state quantities are being converged onto the hyperplane, the state quantities are converged toward a given balanced point (a point of convergence) by an equivalent control input.

The sliding mode control process has excellent characteristics in that once the state quantities are converged onto the hyperplane, the state quantities can stably be converged toward the balanced point without being substantially subject to effects of disturbances, etc.

For determining a correction quantity for the air-fuel ratio of the internal combustion engine in order to adjust the concentration of a component, such as oxygen concentration, of the exhaust gas downstream of the catalytic converter to a predetermined appropriate value, it is possible to regard the value of the concentration of the component of the exhaust gas downstream of the catalytic converter and a rate of change thereof as state qualities of the exhaust system which is an object to be controlled, and determine the correction quantity for the air-fuel ratio in order to converge those state qualities toward a balanced point on a hyperplane, where the value of the concentration and its rate of change are a predetermined appropriate value and "0", respectively, according to the sliding mode control process. If the correction quantity for the air-fuel ratio is determined according to the sliding mode control process, then the concentration of the component of the exhaust gas downstream of the catalytic converter can be adjusted to the predetermined appropriate value with higher accuracy than according to the conventional PID control process or the like.

Various studies made by the inventors, however, have indicated that the general sliding mode control process is susceptible to the dead time present in the object to be controlled and the disturbances until the state quantities of the object to be controlled converge onto the hyperplane.

In the application of the sliding mode control process to the control of the air-fuel ratio of the internal combustion engine, the exhaust system including the catalytic converter suffers a long dead time and various disturbances, as described above.

Therefore, even if a correction quantity for the basic air-fuel ratio is determined according to the sliding mode control process, the state quantities (the value of the air-fuel ratio ad its rate of change) of the air-fuel ratio downstream of the catalytic converter cannot stably be converged onto the hyperplane, with the result that the air-fuel ratio downstream of the catalytic converter cannot stably be converged toward a predetermined appropriate value.

SUMMARY OF THE INVENTION

It is therefore an object of the present invention to provide an air-fuel control system for an internal combustion engine which is capable of adjusting the concentration of a certain component down stream of a catalytic converter mounted on the exhaust system of the internal combustion engine highly accurately to a predetermined appropriate value while eliminating effects of a dead time present in the exhaust system, for thereby allowing the catalytic converter to sufficiently maintain a desired ability to purify an exhaust gas emitted from the internal combustion engine.

Another object of the present invention is to provide an air-fuel control system for an internal combustion engine which is capable of adjusting the concentration of a certain component downstream of a catalytic converter mounted on the exhaust system of the internal combustion engine highly accurately to a predetermined appropriate value regardless of a dead time and disturbances present in the exhaust system, for thereby allowing the catalytic converter to reliably maintain a desired ability to purify an exhaust gas emitted from the internal combustion engine.

Still another object of the present invention is to provide an air-fuel control system for an internal combustion engine which can maximize the ability of a catalytic converter to purify an exhaust gas emitted from the internal combustion engine for thereby increasing the purified exhaust gas emission capability of the internal combustion engine using the catalytic converter.

To accomplish the above objects, there is provided in accordance with the present invention an air-fuel control system for use with an internal combustion engine, comprising a catalytic converter disposed in an exhaust system of the internal combustion engine, for purifying an exhaust gas emitted from the internal combustion engine, a first exhaust gas sensor disposed in the exhaust system for detecting an air-fuel ratio of the exhaust gas upstream of the catalytic converter, a second exhaust gas sensor disposed in the exhaust system for detecting the concentration of a component of the exhaust gas which has passed through the catalytic converter, downstream of the catalytic converter, correction quantity calculating means for determining a correction quantity to correct an air-fuel ratio of the internal combustion engine based on an output from the second exhaust gas sensor so as to equalize the concentration of the component of the exhaust gas downstream of the catalytic converter to a predetermined appropriate value, control means for controlling the air-fuel ratio of the internal combustion engine based on the correction quantity determined by the correction quantity calculating means and an output from the first exhaust gas sensor so as to converge the concentration of the component of the exhaust gas downstream of the catalytic converter toward the predetermined appropriate value, and state predicting means for estimating the concentration, detected by the second exhaust gas sensor, of the component of the exhaust gas downstream of the catalytic converter after a dead time present in an exhaust system including the catalytic converter between the first and second exhaust gas sensors, based on outputs up to present from the first exhaust gas sensor and the second exhaust gas sensor, the correction quantity calculating means comprising means for determining the air-fuel ratio of the internal combustion engine so as to equalize the concentration of the component to the predetermined appropriate value, based on the concentration, estimated by the state predicting means, of the component of the exhaust gas downstream of the catalytic converter.

For determining the correction quantity to correct the air-fuel ratio of the internal combustion engine with the correction quantity calculating means, the state predicting means estimates the concentration, detected by the second exhaust gas sensor, of the component of the exhaust gas downstream of the catalytic converter after the dead time present in the exhaust system including the catalytic converter between the first and second exhaust gas sensors, and the correction quantity calculating means determines the correction quantity to correct the air-fuel ratio of the internal combustion engine so as to equalize the concentration of the component to the predetermined appropriate value, based on the concentration, estimated by the state predicting means, of the component of the exhaust gas downstream of the catalytic converter. Therefore, the dead time present in the exhaust system can be compensated for. Consequently, the correction quantity calculating means can determine the correction quantity so as to equalize the concentration of the component of the exhaust gas downstream of the catalytic converter to the predetermined appropriate value stably regardless of the dead time of the exhaust system. The air-fuel ratio of the internal combustion engine is controlled based on the correction quantity determined by the correction quantity calculating means and the output from the first exhaust gas sensor so as to converge the concentration of the component of the exhaust gas downstream of the catalytic converter toward the predetermined appropriate value.

Accordingly, the concentration of the component of the exhaust gas downstream of the catalytic converter can be adjusted to the predetermined appropriate value while eliminating effects of the dead time present in the exhaust system, and hence the catalytic converter can maintain a sufficient exhaust gas purifying capability.

Preferably, the predetermined appropriate value is determined as a value to maximize an exhaust gas purifying capability of the catalytic converter.

In as much as the concentration of the component of the exhaust gas downstream of the catalytic converter is adjusted highly accurately to a value which maximizes the exhaust gas purifying capability of the catalytic converter, the exhaust gas purifying capability of the catalytic converter is stably maximized, and hence the emission control ability of the internal combustion engine including the catalytic converter is increased.

The second exhaust gas sensor comprises an oxygen concentration sensor. Therefore, the concentration of the component detected by the second exhaust gas sensor is the oxygen concentration of the exhaust gas that has passed through the catalytic converter, and the oxygen concentration corresponds to the air-fuel ratio of the exhaust gas.

The state predicting means comprises means for modeling the exhaust system including the catalytic converter between the first and second exhaust gas sensors as a model including a delay element of at least second order which has an input represented by the air-fuel ratio of the exhaust gas detected by the first exhaust gas sensor and an output represented by the concentration of the component sensor detected by the second exhaust gas sensor, and for estimating the concentration of the component of the exhaust gas downstream of the catalytic converter based on the model on the assumption that the air-fuel ratio up to present of the exhaust gas detected by the first exhaust gas sensor is applied as the input to the model after elapse of the dead time.

Since the exhaust system is modeled as a model including a delay element of at least second order, the exhaust model can be expressed by a suitable model taking into account actual dynamic characteristics thereof. The present air-fuel ratio detected by the first exhaust gas sensor is applied as the input to the model after elapse of the dead time. Therefore, the concentration of the component of the exhaust gas downstream of the catalytic converter can accurately be estimated while taking into account the dead time of the exhaust system.

The model includes as the delay element a spring and a damper for damping vibrations of the spring, and represents a spring mass system in which a vibration force applied to the spring is expressed by the air-fuel ratio of the exhaust gas upstream of the catalytic converter and a length of the spring is expressed by a quantity indicative of the concentration of the component downstream of the catalytic converter. The model is thus relatively simple.

While the correction quantity calculating means may determine the correction quantity to correct the air-fuel ratio of the internal combustion engine according to a PID control process or the like, the correction quantity calculating means preferably includes sliding mode control means for determining the correction quantity to correct the air-fuel ratio of the internal combustion engine according to a sliding mode control process.

Because the sliding mode control means determines the correction quantity to correct the air-fuel ratio of the internal combustion engine so as to equalize the concentration of the component of the exhaust gas downstream of the catalytic converter to the predetermined appropriate value, based on the concentration of the component estimated by the state predicting means, the dead time present in the exhaust system is compensated for in the determination of the correction quantity. The sliding mode control means can thus determine the correction quantity in order to converge state quantities of the concentration of the component of the exhaust gas downstream of the catalytic converter, i.e., a value of the concentration of the component and a rate of change thereof, stably onto a hyperplane of the sliding mode control process and further toward a balanced point on the hyperplane regardless of the dead time. On the hyperplane, the sliding mode control process is highly stable thereby to eliminate effects of disturbances, effects of an error in estimating the concentration of the component of the exhaust gas downstream of the catalytic converter with the state predicting means, and effects of an error in modeling the object to be controlled.

According to the sliding control mode process, therefore, the concentration of the component can be adjusted to the predetermined appropriate value without regard to the dead time and disturbances present in the exhaust system, and hence the desired exhaust gas purifying capability of the catalytic converter is reliably maintained.

The sliding mode control means comprises means for determining the correction quantity to correct the air-fuel ratio of the internal combustion engine according to an adaptive sliding mode control process. The adaptive sliding mode control process allows the concentration of the component of the exhaust gas downstream of the catalytic converter to be adjusted more stably to the predetermined appropriate value. Specifically, the adaptive sliding mode control process is a sliding mode control process taking into account effects of disturbances, etc. for converging state quantities of the object to be controlled onto the hyperplane. If the adaptive sliding mode control process is employed by the sliding mode control means, then the dead time of the exhaust system can be compensated for by the state predicting means, and state quantities of the concentration of the component of the exhaust gas downstream of the catalytic converter, i.e., a value of the concentration of the component and a rate of change thereof, can be converged stably onto the hyperplane while eliminating effects of disturbances as well as the dead time. After the concentration of the component of the exhaust gas downstream of the catalytic converter has been converged onto the hyperplane, the state quantities can be converged highly stably toward a balanced point on the hyperplane where the concentration of the component of the exhaust gas downstream of the catalytic converter coincides with the predetermined appropriate value.

According to the adaptive sliding mode control process, therefore, the concentration of the component of the exhaust gas downstream of the catalytic converter can highly accurately be adjusted to the predetermined appropriate value while eliminating effects of the dead time and disturbances present in the exhaust system.

The sliding mode control means comprises means for modeling the exhaust system including the catalytic converter between the first and second exhaust gas sensors as a model including a delay element of at least second order which has an input represented by the air-fuel ratio of the exhaust gas detected by the first exhaust gas sensor and an output represented by the concentration, estimated by the state predicting means, of the component of the exhaust gas downstream of the catalytic converter, and for determining the correction quantity to correct the air-fuel ratio of the internal combustion engine so as to equalize the output of the model to the predetermined appropriate value, according to the adaptive sliding mode control process.

Since the exhaust system is modeled as a model including a delay element of at least second order, actual dynamic characteristics of the exhaust system can be expressed by a suitable model for the adaptive sliding mode control process. The correction quantity to correct the air-fuel ratio of the internal combustion engine is determined according to the adaptive sliding mode control process so as to equalize the output of the model, i.e., the concentration, estimated by the state predicting means in view of the dead time, of the component of the exhaust gas downstream of the catalytic converter, to the predetermined appropriate value. Consequently, the air-fuel ratio of the internal combustion engine can be controlled at an optimum air-fuel ratio for equalizing the concentration of the component of the exhaust gas downstream of the catalytic converter to the predetermined appropriate value.

The model includes as the delay element a spring and a damper for damping vibrations of the spring, and represents a spring mass system in which a vibration force applied to the spring is expressed by the air-fuel ratio of the exhaust gas upstream of the catalytic converter and a length of the spring is expressed by a quantity indicative of the concentration of the component downstream of the catalytic converter. The model is thus relatively simple.

In the model of the exhaust system including the catalytic converter, a model error based on changes in operating conditions of the internal combustion engine, aging of the catalytic converter, etc. can be absorbed by the adaptive sliding mode control process.

The sliding mode control means has a plurality of state quantities of the exhaust system, including at least the concentration, estimated by the state predicting means, of the component of the exhaust gas downstream of the catalytic converter and a rate of change of the concentration of the component, and a predetermined linear function having the state quantities as variables, and the sliding mode control means comprises nonlinear input calculating means for determining a correction quantity to correct the air-fuel ratio of the internal combustion engine so as to converge the state quantities onto a hyperplane represented by the linear function according to reaching and adaptive control laws of the adaptive sliding mode control process, equivalent control input calculating means for determining a correction quantity to correct the air-fuel ratio of the internal combustion engine so as to converge the state quantities toward a balanced point on the hyperplane while converging the state quantities onto the hyperplane, and means for determining the correction quantity to correct the air-fuel ratio of the internal combustion engine by adding the correction quantities determined by the nonlinear input calculating means and the equivalent control input calculating means.

When the state quantities of the exhaust system, including at least the concentration, estimated by the state predicting means, of the component downstream of the catalytic converter and the rate of change of the concentration of the component, are converged onto the hyperplane, these state quantities are reliably converged toward the balanced point (a point where the concentration of the component of the exhaust gas downstream of the catalytic converter coincides with the predetermined appropriate value) without being affected by disturbances, a model error, etc. by the correction quantity, determined by the equivalent control input calculating means. The correction quantity determined by the nonlinear input calculating means acts to converge the state quantities, including the concentration of the component of the exhaust gas downstream of the catalytic converter, onto the hyperplane. By determining the correction quantity according to the reaching and adaptive control laws of the adaptive sliding mode control process, and also by using state quantities estimated by the state predicting means as the state quantities, the state quantities can be converged onto the hyperplane while eliminating effects of disturbances, a model error, etc.

The correction quantities determined respectively by the nonlinear input calculating means and the equivalent control input calculating means are added into a sum as the correction quantity to correct the air-fuel ratio of the internal combustion engine. This allows the concentration of the component of the exhaust gas downstream of the catalytic converter to be adjusted to the predetermined appropriate value highly stably against disturbances, a model error, a dead time, etc.

The reaching control law is a control law for converging the state quantities onto the hyperplane when there is no effect of disturbances in the adaptive sliding mode control process. The adaptive control law is a control law for compensating for an effect of disturbances when the state quantities are converged onto the hyperplane in the adaptive sliding mode control process.

The air-fuel control system further comprises stability decision means for determining stability of the adaptive sliding mode control means for calculating the correction quantity to correct the air-fuel ratio of the internal combustion engine, based on a value of the linear function, and correction quantity calculation limiting means for limiting calculations of the correction quantity based on the stability determined by the stability decision means.

In the adaptive sliding mode control process which employs the concentration, estimated by the state predicting means, of the component of the exhaust gas, basically, the state quantities can be converged onto the hyperplane (the linear function has a value of "0" on the hyperplane) without regard to the dead time and disturbances, etc. of the exhaust system, and further toward the balanced point on the hyperplane. If the state quantities are not present on the hyperplane and the value of the linear function is not "0", then the convergence of the state quantities onto the hyperplane may become unstable depending on the type of disturbances. This unstable convergence can be avoided by determining stability of the adaptive sliding mode control means for calculating the correction quantity depending on the value of the linear function and limiting calculations of the correction quantities depending on the determined stability.

The correction quantity calculation limiting means maintains the correction quantity at a predetermined value if the calculations of the correction quantity by the adaptive sliding mode control means are determined as unstable by the stability decision means, for thereby eliminating instability of the adaptive sliding mode control process for adjusting the concentration of the component of the exhaust gas downstream of the catalytic converter to the predetermined appropriate value.

Specifically, the predetermined value is either a latest value of the correction quantity calculated by the adaptive sliding mode control means before the calculations of the correction quantity by the adaptive sliding mode control means are determined as unstable by the stability decision means or "0". With the predetermined value being thus established, instability of the adaptive sliding mode control process can be eliminated.

The stability decision means comprises means for determining stability of the adaptive sliding mode control means by comparing at least one of the magnitude of a value of the linear function, the magnitude of a rate of change of the value of the linear function, and a product of the value of the linear function and the rate of change thereof with a predetermined value.

According to the present invention, the air-fuel ratio of the internal combustion engine is controlled on the basis of the correction quantity determined by the first exhaust gas sensor and the correction quantity calculating means, as follows:

The air-fuel control system further comprises target air-fuel ratio calculating means for calculating a target air-fuel ratio for the exhaust gas upstream of the catalytic converter to converge the concentration of the component toward the predetermined appropriate value, depending on the correction quantity determined by the correction quantity calculating means, and feedback control means for controlling a rate at which fuel is supplied to the internal combustion engine so as to converge the air-fuel ratio, detected by the first exhaust gas sensor, of the exhaust gas upstream of the catalytic converter toward the target air-fuel ratio calculated by the target air-fuel ratio calculating means, whereby the air-fuel ratio of the internal combustion engine can be controlled to converge the concentration of the component of the exhaust gas downstream of the catalytic converter toward the predetermined appropriate value by controlling the rate at which fuel is supplied to the internal combustion engine with the feedback control means.

As described above, the target air-fuel ratio of the exhaust gas upstream of the catalytic converter is calculated by the target air-fuel ratio calculating means depending on the correction quantity determined by the correction quantity calculating means, and the rate at which fuel is supplied to the internal combustion engine is feedback-controlled so as to converge the air-fuel ratio of the exhaust gas, detected by the first exhaust gas sensor, up-stream of the catalytic converter toward the calculated target air-fuel ratio. In this manner, the concentration of the component of the exhaust gas downstream of the catalytic converter can be controlled accurately at the predetermined appropriate value.

The target air-fuel ratio calculating means comprises mean for calculating the target air-fuel ratio by correcting a basic air-fuel ratio, determined depending on operating conditions of the internal combustion engine, of the exhaust gas upstream of the catalytic converter, with the correction quantity determined by the correction quantity calculating means. The operating conditions of the internal combustion engine include at least a rotational speed and/or a load of the internal combustion engine for calculating an optimum target air-fuel ratio of the exhaust gas upstream of the catalytic converter for converging the concentration of the component toward the predetermined appropriate value.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 17(a) through 17(c) are diagrams showing the results of a simulation process effected on the air-fuel control system shown in FIG. 1 and a conventional air-fuel control system.

DETAILED DESCRIPTION OF THE PREFERRED EMBODIMENTS

Figure 1:
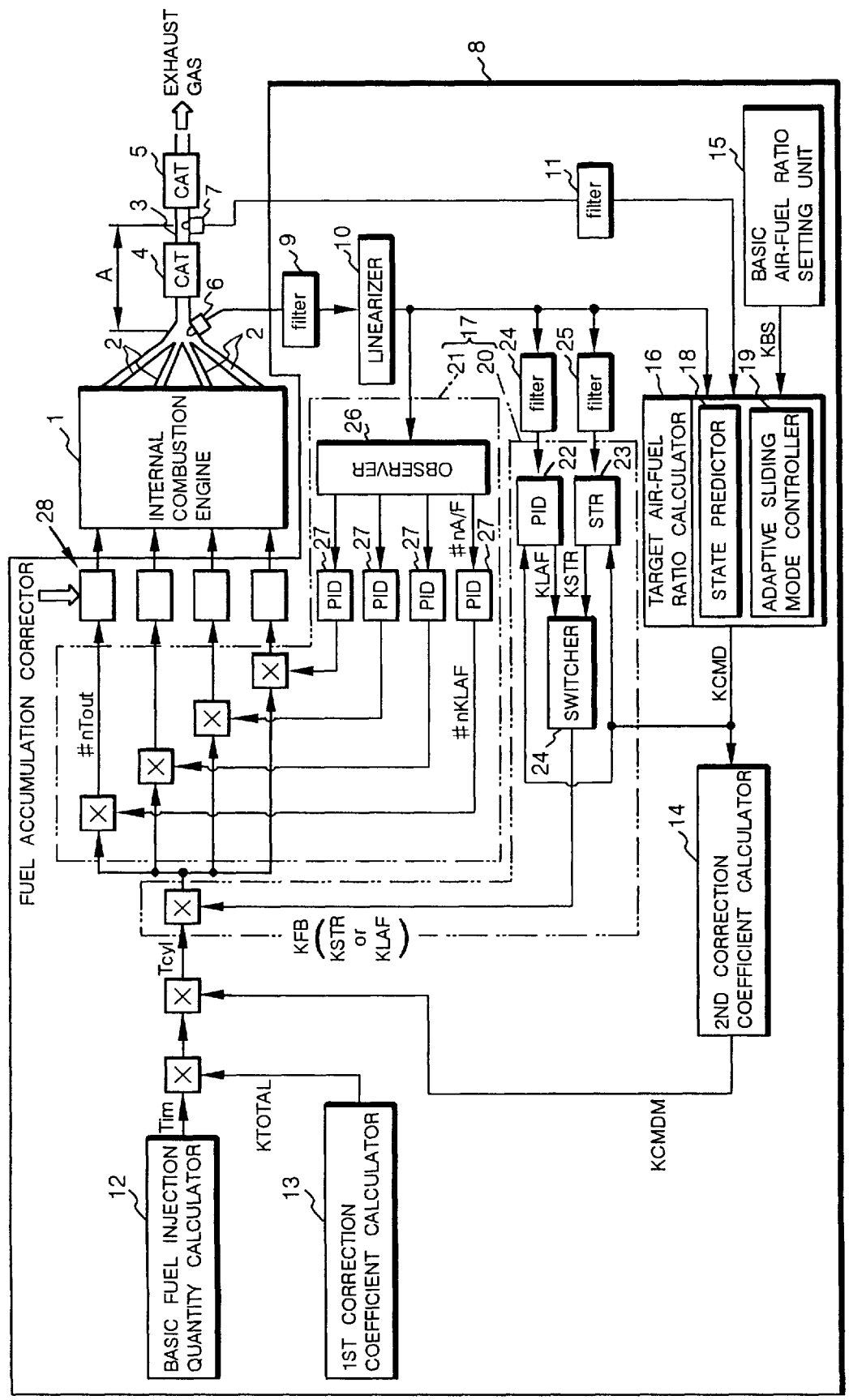
FIG. 1 is a block diagram of an air-fuel control system for an internal combustion engine according to an embodiment of the present invention.

FIG. 1 shows in block form an air-fuel control system for an internal combustion engine according to an embodiment of the present invention. As shown in FIG. 1, an internal combustion engine 1 such as a four-cylinder internal combustion engine on which air-fuel ratio control is to be effected includes exhaust pipes 2 extending from the respective cylinders and joined together to a single main exhaust pipe 3 near the cylinder block. Two three-way catalytic converters 4, 5 are mounted in the main exhaust pipe 3 at successively downstream locations thereon. The downstream catalytic converter 5 may be dispensed with.

The air-fuel control system combined with the internal combustion engine 1 comprises a wide-range air-fuel ratio sensor 6 mounted as a first exhaust gas sensor on the junction of the exhaust pipes 2 upstream of the catalytic converter 4, an $O_2$ sensor (oxygen concentration sensor) 7 mounted as a second exhaust gas sensor on the main exhaust pipe 3 downstream of the catalytic converter 4, and a control unit 8 for carrying out a control process (described later on) based on detected output signals from the sensors 6, 7. The control unit 8 is supplied with detected output signals from the sensors 6, 7 and also detected output signals from various other sensors including a engine speed sensor, an intake pressure sensor, a coolant temperature sensor, etc.

The wide-range air-fuel ratio sensor 6 is in the form of an $O_2$ sensor, and outputs a signal having a level depending on the concentration of oxygen (which is commensurate with the air-fuel ratio of an air-fuel mixture that is supplied to the internal combustion engine 1) representative of the air-fuel ratio of an exhaust gas in the junction of the exhaust pipes 2 upstream of the catalytic converter 4. The output signal from the wide-range air-fuel ratio sensor 6 passes through a filter 9 in the control unit 8 which removes high-frequency noises from the output signal, and then is converted by a linearizer 10 in the control unit 8 into a signal having a level which is proportional to the oxygen concentration (air-fuel ratio) of an exhaust gas in a wide range of oxygen concentrations. The wide-range air-fuel ratio sensor 6 whose output signal will thus be linearized will hereinafter be referred to as an LAF sensor 6.

Figure 2:
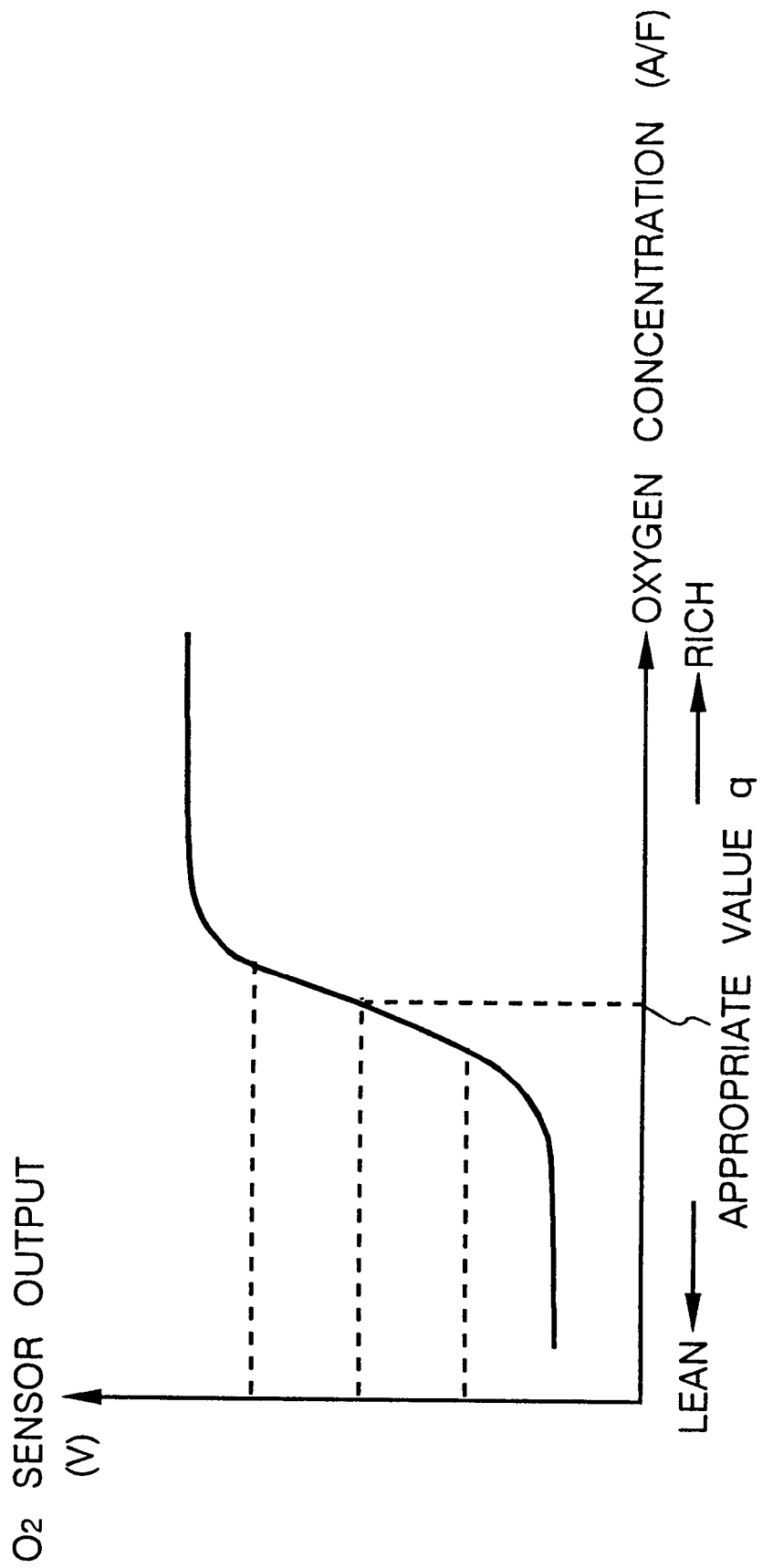
FIG. 2 is a diagram showing output characteristics of an $O_2$ sensor used in the air-fuel control system shown in FIG. 1.

The $O_2$ sensor 7 disposed downstream of the catalytic converter 4 outputs a signal having a level depending on the oxygen concentration (which is commensurate with the air-fuel ratio of the exhaust gas that has passed through the catalytic converter 4) of the exhaust gas that has passed through the catalytic converter 4. As shown in FIG. 2, the output signal from the $O_2$ sensor 7 is substantially proportional with high sensitivity to the oxygen concentration of the exhaust gas that has passed through the catalytic converter 4, with the air-fuel ratio of the air-fuel mixture supplied to the internal combustion engine 1 (the air-fuel ratio of the exhaust gas emitted from the internal combustion engine 1) being in a range close to a predetermined appropriate value. High-frequency noises are removed from the output signal of the $O_2$ sensor 7 by the filter 11 in the control unit 8.

The control unit 8 comprises a microcomputer and has as its main functions a basic fuel injection quantity calculator 12 for determining a basic fuel injection quantity Tim to be injected into the internal combustion engine 1, a first correction coefficient calculator 13 for determining a first correction coefficient KTOTAL to correct the basic fuel injection quantity Tim in view of an exhaust recirculation ratio (the proportion of the exhaust gas contained in intake air of the internal combustion engine 1) of the internal combustion engine 1, a purged quantity of fuel supplied to the internal combustion engine 1 when a canister (not shown) thereof is purged, the coolant temperature and intake temperature of the internal combustion engine 1, etc., a second correction coefficient calculator 14 for determining a second correction coefficient KCMDM to correct the basic fuel injection quantity Tim in view of the charging efficiency of intake air corresponding to a target air-fuel ratio from the target air-fuel ratio at the LAF sensor 6, a basic air-fuel ratio setting unit 15 for establishing a basic air-fuel ratio KBS (a basic air-fuel ratio at the LAF sensor 6) of the internal combustion engine 1, a target air-fuel ratio calculator 16 for correcting the basic air-fuel ratio KBS based on the output signal from the $O_2$ sensor 7 thereby to determine a target air-fuel ratio KCMD at the LAF sensor 6, and a feedback controller 17 for feedback-controlling a fuel injection quantity (fuel supply quantity) of the internal combustion engine 1 based on the output signal from the LAF sensor 6 so as to converge the air-fuel ratio at the LAF sensor 6 toward the target air-fuel ratio KCMD.

The basic fuel injection quantity calculator 12 determines a reference fuel injection quantity from the rotational speed and intake pressure of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

Specific methods of calculating the basic fuel injection quantity Tim, the first correction coefficient KTOTAL, and the second correction coefficient KCMDM are disclosed in Japanese laid-open patent publication No. 5-79374 which corresponds to U.S. Pat. No. 5,253,630, and will not be described in detail below. The basic fuel injection quantity Tim is corrected by being multiplied by the first correction coefficient KTOTAL and the second correction coefficient KCMDM, producing a demand fuel injection quantity Tcyl.

The basic air-fuel ratio setting unit 15 determines a basic air-fuel ratio KBS from the rotational speed and intake pressure (which represents the load on the internal combustion engine 1) of the internal combustion engine 1 using a predetermined map.

The target air-fuel ratio calculator 16 comprises a state predictor 18 for estimating state quantities (specifically, the oxygen concentration at the $O_2$ sensor 7 and a changing degree such as a change or rate of change of the oxygen concentration at the $O_2$ sensor 7) in an exhaust system A which extends from the LAF sensor 6 to the $O_2$ sensor 7 and includes the catalytic converter 4, in view of a dead time present in the exhaust system A, and an adaptive sliding mode controller 19 (correction quantity calculating means) for determining a correction quantity for the basic air-fuel ratio KBS based on the state quantities estimated by the state predictor 18 according to an adaptive sliding mode control process. The target air-fuel ratio calculator 16 calculates the target air-fuel ratio KCMD by correcting the basic air-fuel ratio KBS with the determined correction quantity, i.e., adding the correction quantity to the basic air-fuel ratio KBS. Details of the state predictor 18 and the adaptive sliding mode controller 19 will be described later on.

The feedback controller 17 comprises a general feedback controller 20 for feedback-controlling a total fuel injection quantity for all the cylinders of the internal combustion engine 1 so as to converge the air-fuel ratio detected by the LAF sensor 6 toward the target air-fuel ratio, and a local feedback controller 21 for feedback-controlling a total fuel injection quantity for each of the cylinders of the internal combustion engine 1.

The general feedback controller 20 determines a feedback correction coefficient KFB to correct the demand fuel injection quantity Tcyl so as to converge the air-fuel ratio detected by the LAF sensor 6 toward the target air-fuel ratio. The general feedback controller 20 comprises a PID controller 22 for determining a feedback correction coefficient KFB from the detected air-fuel ratio from the LAF sensor 6 and the target air-fuel ratio according to a known PID control process so as to eliminate any difference between the detected air-fuel ratio from the LAF sensor 6 and the target air-fuel ratio, and an adaptive controller 23 (indicated by "STR" in FIG. 1) which is a recursive-type controller for adaptively determining a feedback correction coefficient KFB from the detected air-fuel ratio from the LAF sensor 6 and the target air-fuel ratio in view of dynamic changes such as changes in operating conditions of the internal combustion engine 1 or characteristic changes thereof. The feedback correction coefficients KFB separately determined by the PID controller 22 and the adaptive controller 23 are selected one at a time by a switcher 24, and the demand fuel injection quantity Tcyl is corrected by being multiplied by the selected feedback correction coefficient KFB. The feedback correction coefficient KFB determined by the PID controller 22 will hereinafter be referred to as "a feedback correction coefficient KLAF" and the feedback correction coefficient KFB determined by the adaptive controller 23 will hereinafter be referred to as "a feedback correction coefficient KSTR". Details of the general feedback controller 20 will be described later on.

The output signal from the LAF sensor 6 is supplied to the PID controller 22 and the adaptive controller 23 through respective filters 24, 25 having respective frequency bands that match the respective control characteristics of the PID controller 22 and the adaptive controller 23.

The local feedback controller 21 comprises an observer 26 for estimating a real air-fuel ratio #nA/F (n=1, 2, 3, 4) of each of the cylinders from the air-fuel ratio detected by the LAF sensor 6 (the air-fuel ratio in the junction of the exhaust pipes 2 extending from the respective cylinders of the internal combustion engine 1), and a plurality of PID controllers 27 (as many as the number of the cylinders) for determining a feedback correction coefficient #nKLAF for a fuel injection quantity for each of the cylinders from the real air-fuel ratio #nA/F of each of the cylinders according to a PID control process so as to eliminate variations of the air-fuel ratios of the cylinders.

Briefly stated, the observer 26 estimates a real air-fuel ratio #nA/F of each of the cylinders as follows: A system from the internal combustion engine 1 to the LAF sensor 6 is considered to be a system for being supplied with a real air-fuel ratio #nA/F of each of the cylinders and out-putting an air-fuel ratio detected by the LAF sensor 6 to the junction of the exhaust pipes 2, and is modeled in view of a detection response delay (e.g., a time lag of first order) of the LAF sensor 6 and a chronological contribution of the air-fuel ratio of each of the cylinders to the air-fuel ratio in the junction of the exhaust pipes 2. Based on the modeled system, a real air-fuel ratio #nA/F of each of the cylinders is estimated from the air-fuel ratio detected by the LAF sensor 6.

Details of the observer 26 are disclosed in Japanese laid-open patent publication No. 7-83094 which corresponds to U.S. Pat. No. 5,531,208, for example, and will not be described below.

Each of the PID controllers 27 of the local feedback controller 21 divides the air-fuel ratio detected by the LAF sensor 6 by an average value of the feedback correction coefficients #nKLAF determined by the respective PID controllers 27 in a preceding cycle time to produce a quotient value, and uses the quotient value as a target air-fuel ratio for the corresponding cylinder. Each of the PID controllers 27 then determines a feedback correction coefficient #nKLAF in a present cycle time so as to eliminate any difference between the target air-fuel ratio and the corresponding real air-fuel ratio #nA/F determined by the observer 26. The local feedback controller 21 multiplies a value, which has been produced by multiplying the demand fuel injection quantity Tcyl by the selected feedback correction coefficient KFB produced by the general feedback controller 20, by the feedback correction coefficient #nKLAF for each of the cylinders, thereby determining an output fuel injection quantity #nTout (n=1, 2, 3, 4) for each of the cylinders.

The output fuel injection quantity #nTout (n=1, 2, 3, 4) thus determined for each of the cylinders is corrected for accumulated fuel particles on intake pipe walls of the internal combustion engine 1 by a fuel accumulation corrector 28 in the control unit 8. The corrected output fuel injection quantity #nTout is applied to each of fuel injectors (not shown) of the internal combustion engine 1, which injects fuel into each of the cylinders with the corrected output fuel injection quantity #nTout. The correction of the output fuel injection quantity in view of accumulated fuel particles on intake pipe walls is disclosed in detail in Japanese laid-open patent publication No. 8-21273 which corresponds to U.S. Pat. No. 5,568,799, for example, and will not be described in detail below.

Details of the state predictor 18 and the adaptive sliding mode controller 19 of the target air-fuel ratio calculator 16 will be described below.

The target air-fuel ratio calculator 16 serves to correct the basic air-fuel ratio KBS into a target air-fuel ratio KCMD at the LAF sensor 6 upstream of the catalytic converter 4 so as to adjust the oxygen concentration of the exhaust gas at the $O_2$ sensor downstream of the catalytic converter 4 to a predetermined adequate value which maximizes the purifying capability of the catalytic converter 4. The target air-fuel ratio calculator 16 has an object (a plant) to be controlled which comprises the exhaust system A which extends from the LAF sensor 6 to the $O_2$ sensor 7 and includes the catalytic converter 4. A value with which to correct the basic air-fuel ratio KBS is determined by the state predictor 18 and the adaptive sliding mode controller 19 according to the adaptive sliding mode control process in view of the dead time present in the exhaust system A. The air-fuel ratio at the LAF sensor 6 will hereinafter be referred to as "pre-CAT A/F", and the oxygen concentration at the $O_2$ sensor 7 will hereinafter be referred to as "post-CAT A/F".

Figure 3:
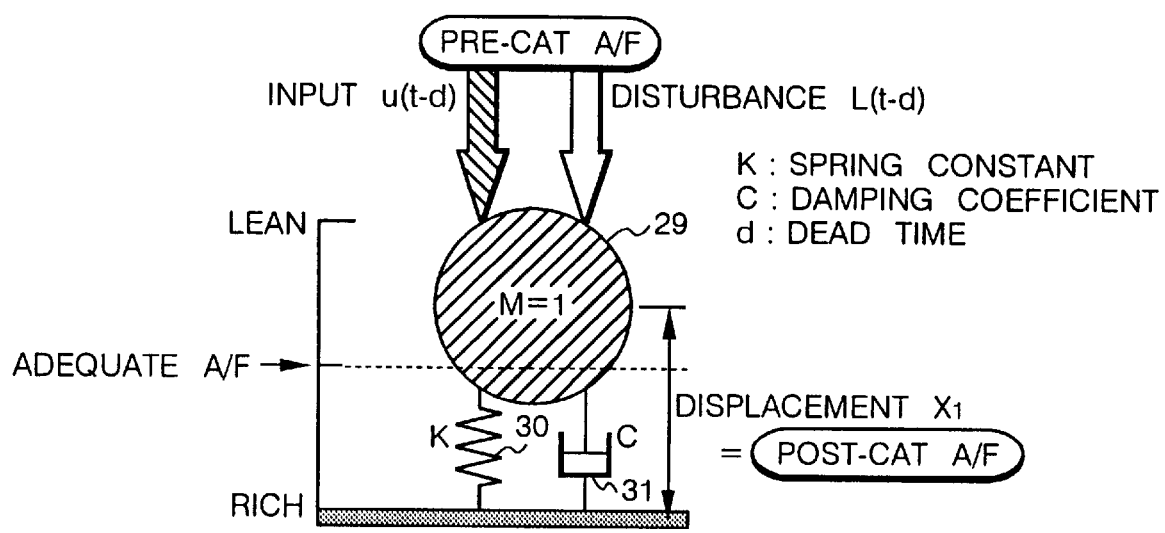
FIG. 3 is a diagram illustrative of a model of an object to be controlled in the air-fuel control system shown in FIG. 1.

To make the adaptive sliding mode control process applicable in view of a dead time present in the exhaust system A which is an object to be controlled (hereinafter referred to as an "object exhaust system A"), the object exhaust system A is modeled by a spring mass system (with a time lag of second order) including a dead time, as shown in FIG. 3.

In spring mass system shown in FIG. 3, a mass body 29 (whose mass M is assumed to be "1") is supported by a spring 30 having a spring constant K and a damper 31 having a damping coefficient C. A vibrating force applied to the mass body 29 corresponds to the pre-CAT A/F, and a displacement $x_1$ of the mass body 29 which is caused by the vibrating force corresponds to the post-CAT A/F. The pre-CAT A/F is the sum of an air-fuel ratio component u (referred to as an "input u") controllable by the feedback controller 17, etc., and an air-fuel ratio component L (referred to as a "disturbance L") such as noises that are not controllable by the feedback controller 17. The input u and the disturbance L contain a dead time d in the exhaust system A. The input u (t−d) and the disturbance L (t−d) prior to the dead time d are applied as a vibrating force to the spring mass system.

If it is assumed in the (model of the spring mass system that a value of the post-CAT A/F which corresponds to a displacement of the mass body 29 is represented by $x_1$ and a rate of change thereof by $x_2$, then using the spring constant K, the damping coefficient C, etc., state equations of the model are given as follows:

$$\begin{cases} \dot{x}_1 = x_2 \\ \dot{x}_2 = -C \cdot x_2 - K \cdot x_1 + b \cdot u(t-d) + b \cdot L(t-d) \end{cases} \quad (1)$$

where b: constant (>0), $$\dot{x}_1 = \frac{dX_1}{dt}, \dot{x}_2 = \frac{dX_2}{dt}.$$

Figure 4:
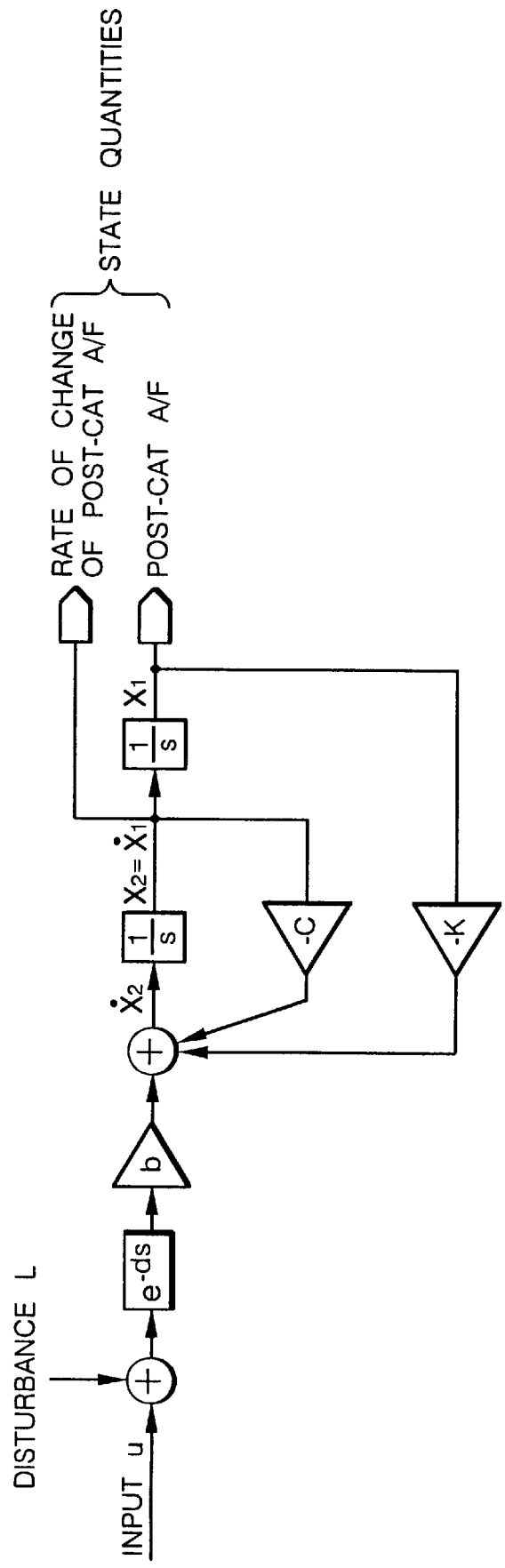
FIG. 4 is a block diagram of the model shown in FIG. 3.

The above state equations (1) are expressed in the block diagram of FIG. 4, which shows a plant model of the object exhaust system A. In FIG. 4, the letter "s" indicates a Laplace operator.

The state predictor 18 and the adaptive sliding mode controller 19 are constructed on the basis of the plant model of the object exhaust system A, and will be described in detail below.

The state predictor 18 serves to compensate for the dead time d in the object exhaust system A in an adaptive sliding mode control process that is carried out by the adaptive sliding mode controller 19. The state predictor 18 estimates a state quantity of the post-CAT A/F which is detected by the $O_2$ sensor 7 after the dead time d in the object exhaust system A so as to correspond to the pre-CAT A/F up to the present time, from the pre-CAT A/F detected by the LAF sensor 6 and the post-CAT A/F detected by the $O_2$ sensor 7. In this embodiment, the state quantity comprises two values, i.e., the value of the post-CAT A/F detected by the $O_2$ sensor 7 (actually the output level of the $O_2$ sensor 7) and a change or rate of change (actually a change or rate of change of the output level of the $O_2$ sensor 7) of the value of the post-CAT A/F.

Figure 5:
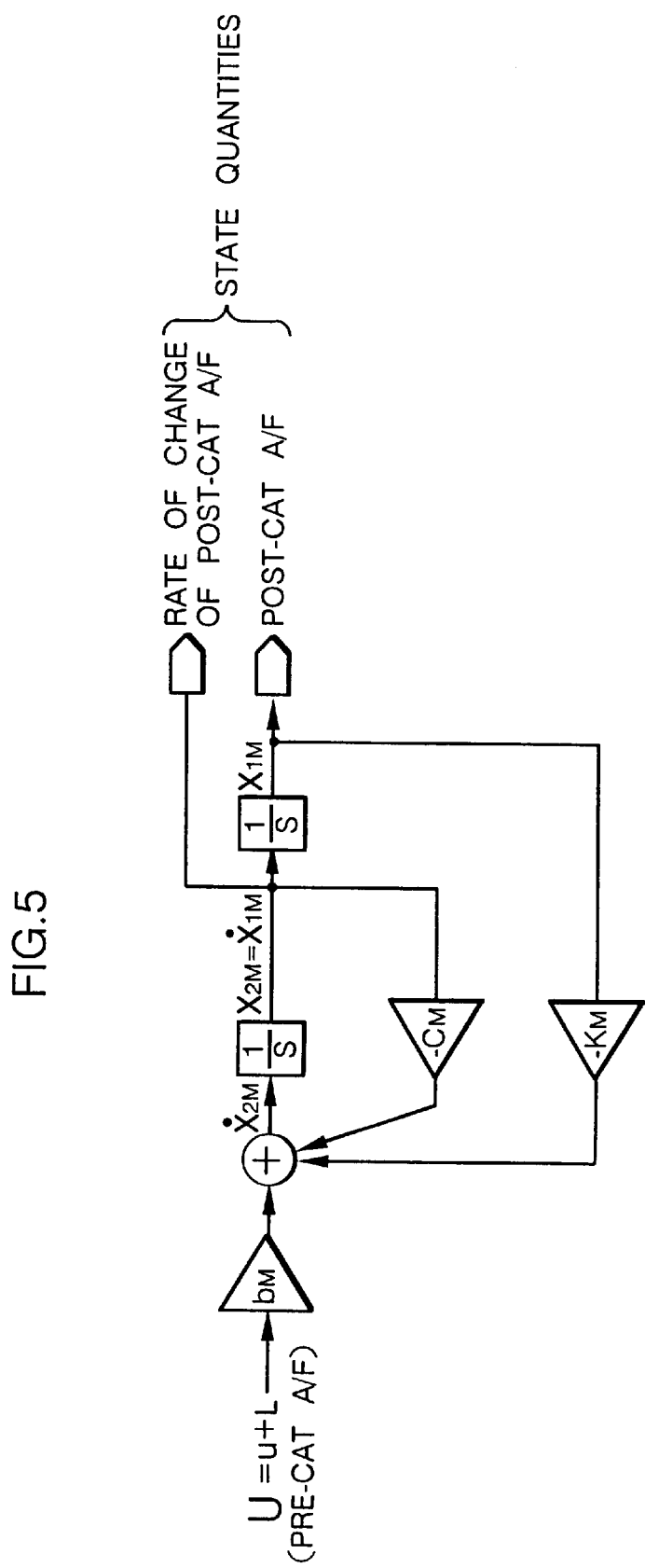
FIG. 5 is a block diagram of a model used as an estimator in a state predictor in the air-fuel control system shown in FIG. 1.

In order to estimate the state quantity, the state predictor 18 is constructed to effect the following processing:

The state predictor 18 uses for the estimation a model (plant model) of a delay element shown in FIG. 5 which is similar to the plant model shown in FIG. 5 except that the term of the dead time (expressed by "$e^{-da}$" in FIG. 4) is dispensed with and the constants C, K, b are replaced with preset values $C_M$, $K_M$, $b_M$, respectively. In the model of the delay element shown in FIG. 5, state equations, which corresponds to the state equations (1), are given as follows:

$$\begin{cases} \dot{x}_{1M} = x_{2M} \\ \dot{x}_{2M} = -C_M \cdot x_{2M} - K_M \cdot x_{1M} + b_M \cdot U(t) \end{cases} \quad (2)$$

where U=u+L.

Figure 6:
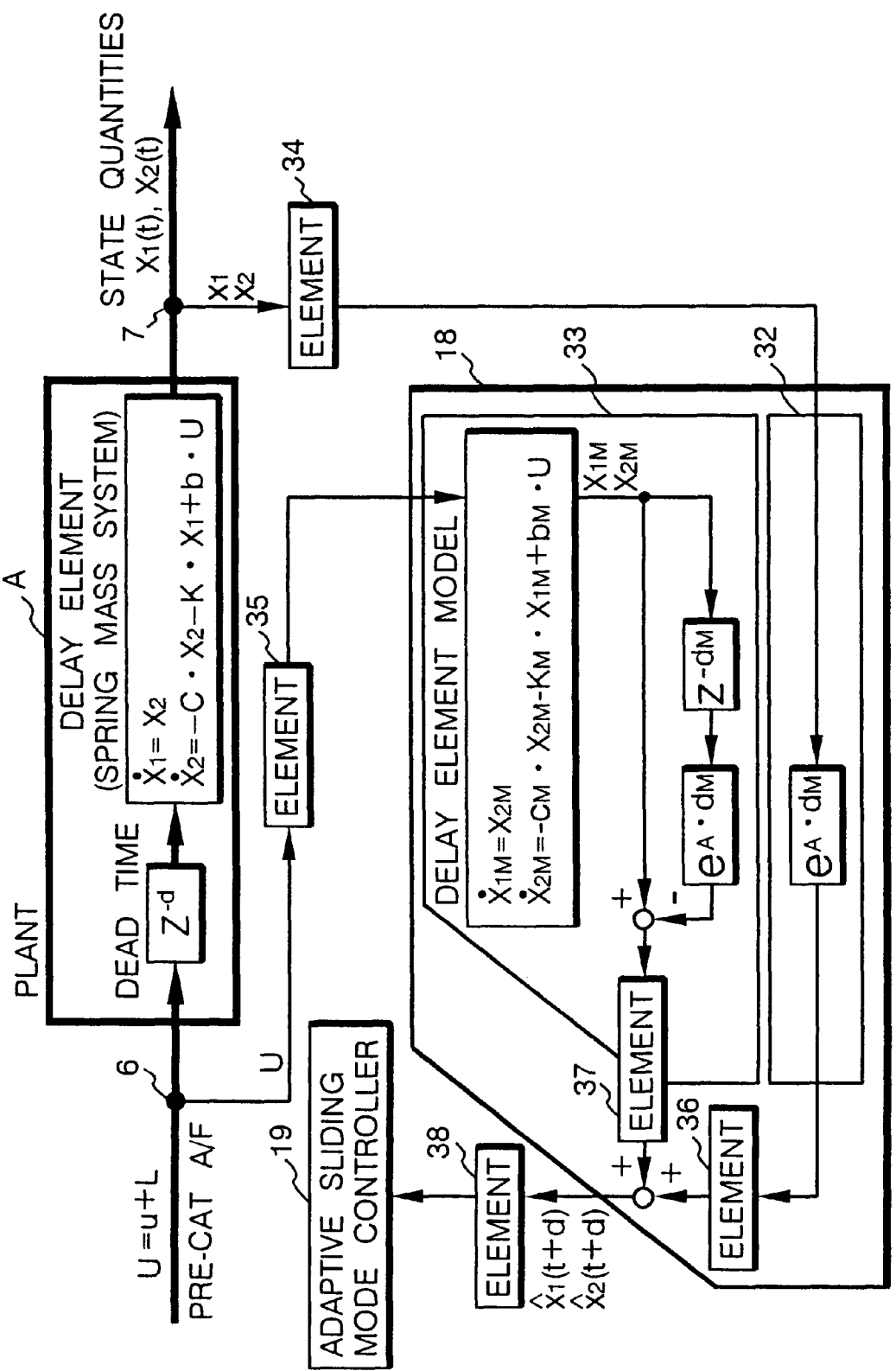
FIG. 6 is a block diagram of the state predictor in the air-fuel control system shown in FIG. 1.

In FIG. 6 and the equations (2), $x_{1M}$, $X_{2M}$ represent the value of the post-CAT A/F and a change or rate of change thereof (state quantity) in the model of the delay element shown in FIG. 5. The preset values $C_M$, $K_M$, $b_M$ are determined by experimentation or the like.

The state predictor 18 uses, as the input U(t) in the equations (2), the pre-CAT A/F actually detected by the LAF sensor 6, and solves the equations (2) in a time-series for state quantities $X_{1M}$, $X_{2M}$. Furthermore, the state predictor 18 determines estimated values $x_1$ hat (=an estimated value of the post-CAT A/F), $x_2$ hat (=an estimated value of a change or rate of change of the post-CAT A/F) of the post-CAT A/F after the dead time d from the present time t from the determined state quantities $x_{1M}$, $X_{2M}$ and state quantities $x_1$, $x_2$ of the post-CAT A/F at the present time t, according to the following equation (3):

$$\begin{bmatrix} \hat{x}_1(t+d) \\ \hat{x}_2(t+d) \end{bmatrix} = e^{A \cdot d_M} \cdot \begin{bmatrix} x_1(t) \\ x_2(t) \end{bmatrix} + \begin{bmatrix} x_{1M}(t) \\ x_{2M}(t) \end{bmatrix} - e^{A \cdot d_M} \cdot \begin{bmatrix} x_{1M}(t-d_M) \\ x_{2M}(t-d_M) \end{bmatrix} \quad (3)$$

where "$e^{At}$" represents a matrix exponential function obtained when the state equations (2) are solved, and "$d_M$" a preset value (identified value) of the dead time d in the object exhaust system A. The dead time $d_M$ is equal to the actual dead time d or set to a greater value ($d_M \geq d$). For the first term of the equation (3), the state quantities $x_1$, $x_2$ (the value of the post-CAT A/F and a change or rate of change thereof) which are actually obtained from the output signal from the $O_2$ sensor are used.

In the equation (3), the first term of the right side is a term for estimating a state quantity of the post-CAT A/F detected by the $O_2$ sensor after the dead time d if the input U (the pre-CAT A/F from the time t−d to the time t) which is applied to the object exhaust system A from the present time t to the time t+d after the dead time d in the object exhaust system A is "0".

The second and third terms of the right side are terms for estimating a change in the state quantity of the post-CAT A/F detected by the $O_2$ sensor after the dead time d with the input U (the pre-CAT A/F from the time t−d to the time t) which is applied to the object exhaust system A from the present time t to the time t+d after the dead time d in the object exhaust system A.

The state predictor 18 which effects the above estimating operations is shown in block form in FIG. 6. As shown in FIG. 6, the state predictor 18 generally comprises an estimator 32 for carrying out the estimating operation represented by the first term of the right side of the equation (3) and an estimator 33 for carrying out the operation to solve the state equations (2) and the estimating operation represented by the second and third terms of the right side of the equation (3).

The estimator 32 is given the state quantities (the value $x_1$ of the post-CAT A/F and a change or rate of change $x_2$ thereof) actually obtained from the output signal from the $O_2$ sensor 7. The state quantities obtained from the output signal from the $O_2$ sensor 7 are filtered or scaled, if necessary, by an element 34, and then applied to the estimator 32. In FIG. 6, the value $x_1$ of the post-CAT A/F and a change or rate of change $x_2$ thereof are shown as being supplied directly from the $O_2$ sensor 7 to the estimator 32 for illustrative purposes. Actually, however, a change or rate of change $x_2$ of the post-CAT A/F is calculated in the control unit 8.

To effect th e above estimating operations, the estimator 33 is given the pre-CAT A/F actually obtained from the output signal from the LAF sensor 6 as the input U (=u +L). The pre-CAT A/F obtained from the output signal from the LAF sensor 6 is filtered or scaled, if necessary, by an element 35, and t hen applied to the estimator 32.

The state predictor 18 adds values determined by the respective estimators 32, 33, and output s the sum a s estimated values $x_1$ hat, $x_2$ hat of the state quantities of the post-CAT A/F detected by the $O_2$ sensor 7 after the dead time d, to the adaptive sliding mode controller 19. The values determined by the respective estimators 32, 33 are added after being filtered and scaled, if necessary, by respective elements 36, 37. The sum (the estimated values $x_1$ hat, $x_2$ hat of the state quantities of the post-CAT A/F after the dead time d) is also filtered and scaled, if necessary, by an element 38, and then outputted to the adaptive sliding mode controller 19. The estimated values $x_1$ hat, $x_2$ hat will hereinafter be referred to as estimated state quantities $x_1$ hat, $x_2$ hat, respectively.

The adaptive sliding mode controller 19 will be described in detail below.

A general sliding mode control process will first briefly be described below with reference to FIG. 7.

The sliding mode control process is a feedback control process of variable structure. According to the sliding mode control process, if there two state quantities $x_1$, $x_2$ of an object to be controlled, then a hyperplane H expressed by σ=0 is designed beforehand using a linear function σ=$s_1 x_1$+$s_2 x_2$ ($s_1$, $s_2$ are coefficients) with the state quantities $x_1$, $x_2$ used as variables therein. The linear function σ is called a switching function. If the degree of a phase plane is larger, then a switching line changes to a switching plane and then to a hyperplane which cannot geometrically be illustrated. The hyperplane may also be called a slip plane.

Figure 7:
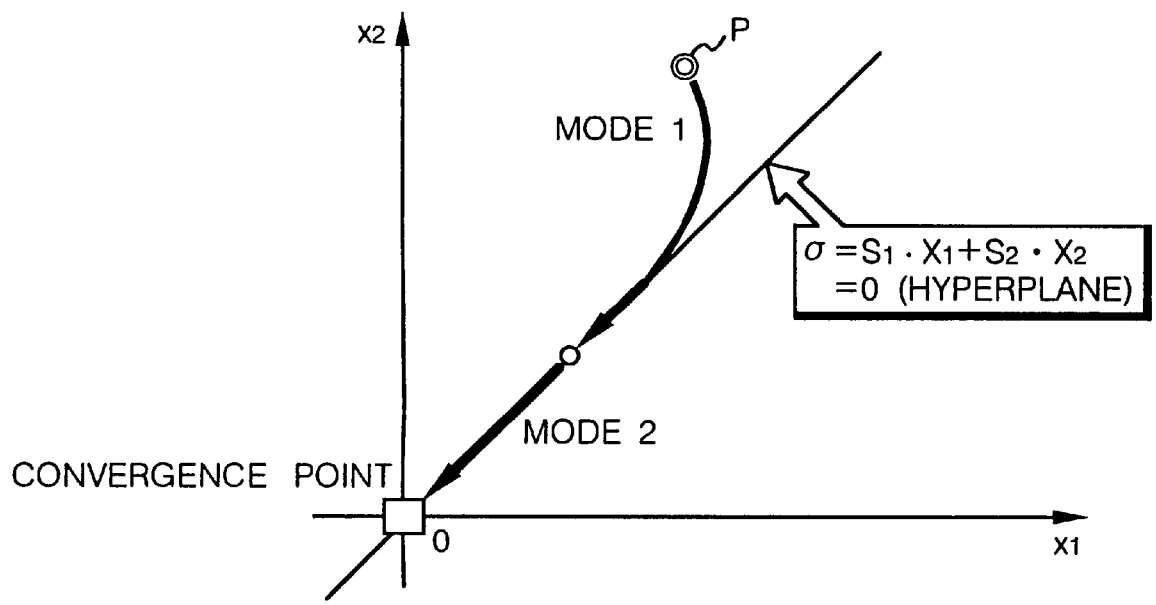
FIG. 7 is a diagram illustrative of a sliding mode control process.

When the state quantities $x_1$, $x_2$ are such that σ≠0 as indicated by a point P in FIG. 7, the state quantities $x_1$, $x_2$ are caused to converge at a high speed onto the hyperplane H (σ=0) under high gain control according to the so-called reaching control law (mode 1), and then to converge toward a balanced point (a converged point which is a point where $x_1$=$x_2$=0) on the hyperplane H while converging onto the hyperplane H according to the so-called equivalent control input (mode 2).

In the sliding mode control process, the state quantities $x_1$, $x_2$ can converge highly stably toward the balanced point on the hyperplane H according to the equivalent control input without being affected by a disturbance, etc. simply when the state quantities $x_1$, $x_2$ are converged onto the hyperplane H. Therefore, it is important to stably converge the state quantities $x_1$, $x_2$ onto the hyperplane H in the mode 1. If there is a disturbance, then it is generally difficult to converge the state quantities $x_1$, $x_2$ stably onto the hyperplane H according to only the reaching control law. In view of this, there has in recent years been proposed an adaptive sliding mode control process which employs an adaptive control law for converging state quantities onto a hyperplane while eliminating the effect of a disturbance, in addition to the reaching control law, as disclosed in, for example, "Sliding mode control—design theory of nonlinear robust control—", pages 134–135, published Oct. 20, 1994 by Corona Co., Ltd.

The adaptive sliding mode controller 19 uses such an adaptive sliding mode control process to calculate a correction quantity for the basic air-fuel ratio from the estimated state quantities $x_1$ hat, $x_2$ hat of the post-CAT A/F. The adaptive sliding mode controller 19 is constructed as follows:

First, the construction of a hyperplane required for the adaptive sliding mode control process of the adaptive sliding mode controller 19 and the equivalent control input will first be described below.

In this embodiment, the adaptive sliding mode controller 19 determines a correction quantity for the basic air-fuel ratio KBS in order to adjust the post-CAT A/F to a predetermined adequate value. Therefore, target values for the estimated state quantities $x_1$ hat, $x_2$ hat of the post-CAT A/F (the estimated value of the post-CAT A/F after the dead time d and the estimated value of its change or rate of change), i.e., values toward which the estimated state quantities $x_1$ hat, $x_2$ hat of the post-CAT A/F are to converge, are set to "an appropriate value" and "0", respectively.

A hyperplane for carrying out the adaptive sliding mode control process with the appropriate value of the post-CAT A/F being "q" is expressed by a linear function according to the following equation (4):

$$\sigma = S_1 \cdot (+e, cir\ x_1 + ee\ -q) + S_2 \cdot +e, cir\ x_2 + ee = 0 \qquad (4)$$

If the estimated state quantities $x_1$ hat, $x_2$ hat are used, then since the dead time d is compensated for by the state predictor 18, the plant model of the object exhaust system A is represented by the structure shown in FIG. 5 where the state quantities $x_{1M}$, $X_2M$ are replaced with the estimated state quantities $x_1$ hat, $x_2$ hat.

Therefore, state equations of the plant model are expressed as follows:

$$\begin{cases} \dot{\hat{x}}_1 = \hat{x}_2 \\ \dot{\hat{x}}_2 = -C_M \cdot \hat{x}_2 - K \cdot \hat{x}_1 + b_M \cdot u(t) + b_M \cdot L(t) \end{cases} \qquad (5)$$

By effecting a linear transformation expressed by the following equations (6) based on the equation (4) in the state equations (5):

$$\begin{cases} \hat{x}_1 = \hat{x}_1 \\ \hat{x}_2 = \dfrac{1}{S_2} \cdot [\sigma - S_1 \cdot (\hat{x}_1 - q)] \end{cases} \qquad (6)$$

and by replacing the disturbance L with "0", the following equations (7) are obtained:

$$\begin{cases} \dot{\sigma} = \left(\dfrac{S_1}{S_2} - C_M\right) \cdot \sigma + \left(C_M \cdot S_1 - K_M \cdot S_2 - \dfrac{S_1^2}{S_2}\right) \cdot \hat{x}_1 + \\ \qquad\qquad \left(\dfrac{S_1^2}{S_2} - C_M \cdot S_1\right) \cdot q + S_2 \cdot b_M \cdot u \\ \qquad\qquad\qquad (n\dot{q} = 0) \\ \hat{x}_2 = \dfrac{1}{S_2} \cdot [\sigma - S_1 \cdot (\hat{x}_1 - q)] \end{cases} \qquad (7)$$

If the sliding mode control process is carried out using the hyperplane expressed by the equation (4), then in the mode 2 for converging the estimated state quantities $x_1$ hat, $x_2$ hat toward the balanced point on the hyperplane while converging them onto the hyperplane, it is necessary to satisfy the following equations:

$$\begin{cases} \sigma = 0 \\ \dot{\sigma} = 0 \end{cases} \qquad (8)$$

Therefore, from the equations (7), an equivalent control input $u_{eq}$ (=u) required in the mode 2 is indicated by the following equation (9):

$$u_{eq} = \dfrac{1}{S_2 \cdot b_M} \cdot \left[\left(\dfrac{S_1^2}{S_2} + K_M \cdot S_2 - C_M \cdot S_1\right) \cdot \hat{x}_1 + \left(C_M \cdot S_1 - \dfrac{S_1^2}{S_2}\right) \cdot q\right] \qquad (9)$$

Then, when the estimated state quantities $x_1$ hat, $x_2$ hat are converged onto the hyperplane by the equivalent control input $u_{eq}$, since $\sigma=0$, the following equation (10) is obtained from the lower one of the equations (7):

$$\dot{\hat{x}}_1 = -\dfrac{S_1}{S_2}(\hat{x}_1 - q) \qquad (10)$$

For the sake of brevity, $s_1=k$, $s_2=1$ ($k=s_1/s_2$). In view of the fact that the target value q (the appropriate value of the post-CAT A/F) for the estimated state quantity $x_1$ hat is "0" (constant value) when the time t <0 and "q" (constant value) when the time t>0, the equation (10) is Laplace-transformed into the following equation (11):

$$\hat{x}_1 = \dfrac{k}{S+k} \cdot \dfrac{q}{s} = \dfrac{-q}{S+k} + \dfrac{q}{s} \qquad (11)$$

where $x_1$ hat represents a Laplace transformation of the estimated state quantity $x_1$ hat, and s represents a Laplace operator.

Consequently, when the equation (11) is inversely Laplace-transformed, the estimated state quantity $x_1$ hat is expressed on the time base by the following equation (12):

$$\hat{x}_1 = -q \cdot e^{-k \cdot t} + q \qquad (12)$$

Figure 8:
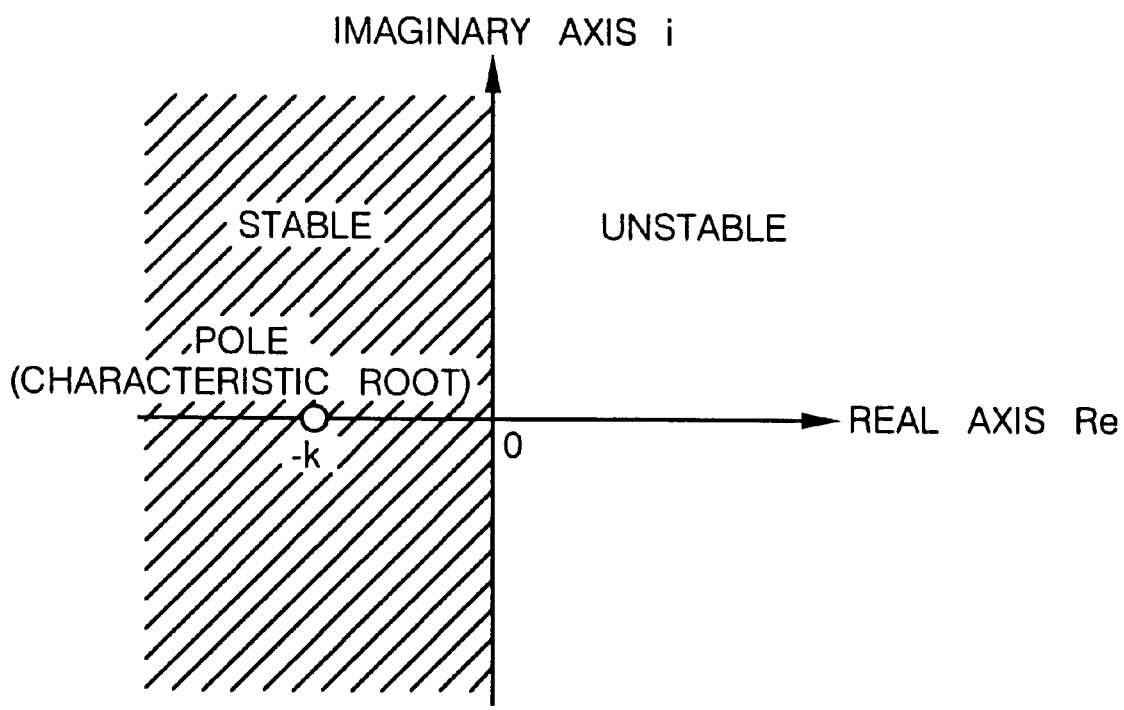
FIG. 8 is a diagram illustrative of the position of a pole in a control unit in the air-fuel control system shown in FIG. 1.

If k>0 ($s_1>0$, $s_2=1$) in the equation (12), then the estimated state quantity $x_1$ hat converges toward the target value q at $t\to\infty$. This means that the characteristic root of the equation (11)–k (the pole of the control system) is positioned in a stable region on a complex plane (a region where the real part of the pole is negative), as shown in FIG. 8.

Therefore, the hyperplane used in this embodiment is established according to the following equation (13):

$$\sigma = k(\hat{x}_1 - q) + \hat{x}_2 = 0 \ (k>0) \qquad (13)$$

A specific value of k in the equation (13) is established based on various experiments and simulations basically such that the estimated state quantities $x_1$ hat, $x_2$ hat will quickly converge onto the hyperplane. In this embodiment, the value of k may be varied as desired as described later on. In this embodiment, since the adaptive sliding mode controller 19 is constructed as a servo-type controller, the target value q for the estimated state quantity $x_1$ hat is $q \neq 0$. However, the adaptive sliding mode controller 19 may be constructed as a regulator-type controller in the same manner as with the above embodiment with the target value q for the estimated state quantity $x_1$ hat being q=0.

The reaching control law of the sliding mode control process is a control law for converging the linear function σ onto the hyperplane (σ=0). Various types of the reaching control law are known in the art. In this embodiment, the acceleration rate law which is characterized by the shortest time required for convergence onto the hyperplane among those various types of the reaching control law is employed.

According to the acceleration rate law, a dynamic characteristic of σ (a rate of change of the value of σ over time) is controlled so that can be expressed by the following equation (14):

$$\dot{\sigma} = -J \cdot |\sigma|^\alpha \cdot sgn(\sigma) \tag{14}$$

where J, α are preset positive constants with 0<α<1, and sgn(σ) is a signum function of σ, sgn (σ)=−1 when σ<0, sgn(σ)=0 when σ=0, and sgn(σ)=1 when σ>0.

When the equation (13) is differentiated with respect to time, and the state equations (5) are used with the disturbance L=0, the following equation (15) is obtained:

$$\dot{\sigma} = (k - C_M) \cdot \hat{x}_2 - K_M \cdot \hat{x}_1 + b_M \cdot u \tag{15}$$

From the equations (14) and (15), an input $u_{sl}$ (=u) to the object exhaust system A is represented by the following equation (16):

$$u_{sl} = \frac{1}{b_M} [-(k - C_M) \cdot \hat{x}_2 + K_M \cdot \hat{x}_1 - J \cdot |\sigma|^\alpha \cdot sgn(\sigma)] \tag{16}$$

The input $u_{sl}$ to the object exhaust system A, which is expressed by the equation (16), is an input (the pre-CAT A/F) to be given to the object exhaust system A in order to adjust the post-CAT A/F to the adequate value q when the disturbance L=0. The first and second terms of the equation (16) agree with the equivalent control input uq expressed by the equation (9) when σ=0, i.e., when the estimated state quantities $x_1$ hat, $x_2$ hat are converged onto the hyperplane, as described below.

$$u_{eq} = \frac{1}{b_M} \{-(k - C_M) \cdot \hat{x}_2 + K_M \cdot \hat{x}_1\} \tag{17}$$

This is made apparent by establishing $s_1/s_2 = k$ in the equation (9), expressing the value q with $x_1$ hat, $x_2$ hat using the equation (13), and substituting it in the equation (9).

The third term of the equation (13) represents a control input for converging the estimated state quantities $x_1$ hat, $x_2$ hat onto the hyperplane according to the reaching control law when the disturbance L=0. A control input according to the reaching control law will hereinafter be referred to as a reaching control input $u_{rch}$ which is expressed by:

$$u_{rch} = \frac{1}{b_M} \{-J \cdot |\sigma|^\alpha \cdot sgn(\sigma)\} \tag{18}$$

The adaptive control law of the adaptive sliding mode control process in the adaptive sliding mode controller 19 is constructed as follows:

As described above, the hyperplane, the equivalent control input $u_{eq}$ and the reaching control input $u_{rch}$ are constructed on the assumption that the disturbance L=0. Actually, however, various disturbances exist in the object exhaust system A, and the plant model used in constructing the hyperplane, etc. suffers a model error with respect to the actual object exhaust system A. If the estimated state quantities $x_1$ hat, $x_2$ hat are converged onto the hyperplane, then the estimated state quantities $x_1$ hat, $x_2$ hat are converged toward the balanced point on the hyperplane without being affected by the disturbances and the model error. At a stage in which the estimated state quantities $x_1$ hat, $x_2$ hat are not converged onto the hyperplane, the estimated state quantities $x_1$ hat, $x_2$ hat are cannot be converged onto the hyperplane with the reaching control input $u_{rch}$ according to the reaching control law.

The adaptive control law used in the adaptive sliding mode controller 19 serves to eliminate the above drawback.

According to the present embodiment, for constructing the adaptive control law in the adaptive sliding mode controller 19, it is assumed that the disturbance L is invariable without depending on time and the estimated state quantities $x_1$ hat, $x_2$ hat, and an integrated term $u_{adp}$ of the linear function σ which is represented by the following equation (19) is added as an adaptive control law term ("$u_{adp}$" will hereinafter be called an "adaptive control input") to the right side of the equation (16), determining a final input $u_{sl}$ to the object exhaust system A.

$$u_{adp} = \frac{1}{b_M} \left( -\int_0^T \sigma \, dt \right) \tag{19}$$

Therefore, the input $u_{sl}$ to the object exhaust system A using the adaptive control law is determined according to the following equation (20):

$$u_{sl} = u_{eq} + u_{rch} + u_{adp} \tag{20}$$

$$= \frac{1}{b_M} \left[ -(k - C_M) \cdot \hat{x}_2 + K_M \cdot \hat{x}_1 - J \cdot |\sigma|^\alpha \cdot sgn(\sigma) - \int_0^T \sigma \, dt \right]$$

The equation (20) represents the simplest form of the adaptive sliding mode control process. It is also possible to employ a more developed form of adaptive control law.

The adaptive sliding mode controller 19 effects calculations according to the equation (20) to determine an input $u_{sl}$ to the object exhaust system A. According to the present embodiment, since the basic air-fuel ratio KBS is corrected so as to adjust the estimated state quantity $x_1$ hat to the appropriate value q ($x_1$ hat=q, $x_2$ hat=0) for thereby indirectly adjusting the post-CAT A/F to the appropriate value q, the adaptive sliding mode controller 19 outputs the input $u_{sl}$ determined by the equation (20) as a correction quantity for the basic air-fuel ratio KBS. The input $u_{sl}$ determined by the equation (20) will hereinafter be referred to as a "basic air-fuel ratio correction quantity $u_{sl}$".

Figure 9:
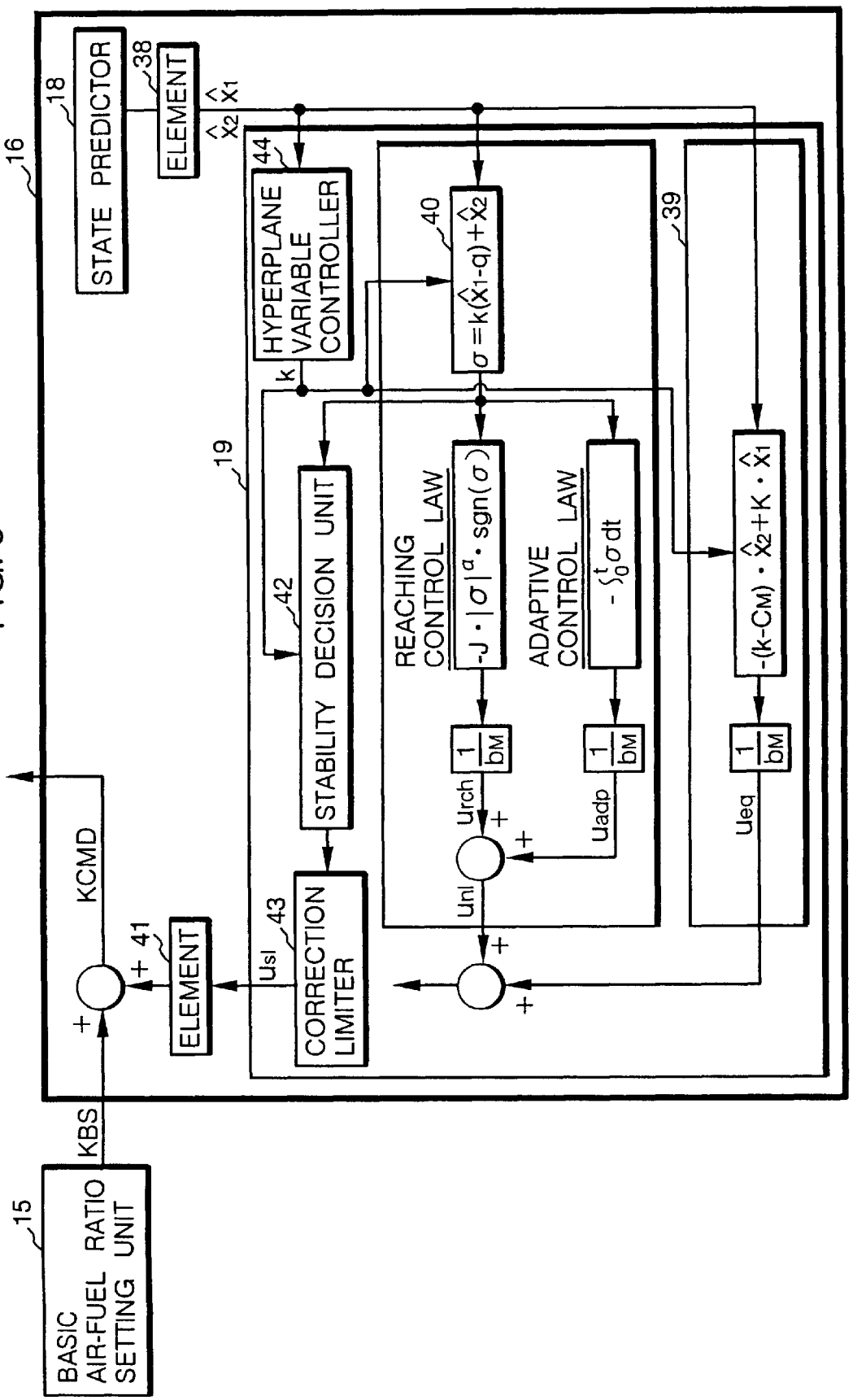
FIG. 9 is a block diagram of an adaptive sliding mode controller in the air-fuel control system shown in FIG. 1.

The adaptive sliding mode controller 19 thus constructed as described above is shown in block form in FIG. 9. As shown in FIG. 9, the adaptive sliding mode controller 19 mainly comprises an equivalent control input calculator 39 for determining the equivalent control input $u_{eq}$, and a nonlinear input calculator 40 for determining the sum $u_{nl}$ (=$u_{rch}+u_{adp}$, hereinafter referred to as a "nonlinear input") of the reaching control input $u_{rch}$ and the adaptive control input $u_{adp}$. These calculators 39, 40 are supplied with the estimated state quantities $x_1$ hat, $x_2$ hat determined by the state predictor 18 through the element 38.

Basically, the adaptive sliding mode controller 19 outputs the basic air-fuel ratio correction quantity $u_{sl}$, which is the sum of the equivalent control input $u_{eq}$ determined by the equivalent control input calculator 39 and the nonlinear input $u_{nl}$. The basic air-fuel ratio correction quantity $u_{sl}$ is scaled and filtered, if necessary, by an element 41, and then stored in a memory (not shown). The basic air-fuel ratio correction quantity $u_{sl}$ is calculated in a cycle time having a predetermined constant period.

The target air-fuel ratio calculator 16, which has the adaptive sliding mode controller 19 and the state predictor 18, adds the basic air-fuel ratio correction quantity $u_{sl}$ stored in the memory to the basic air-fuel ratio KBS, thereby correcting the basic air-fuel ratio KBS into the target air-fuel ratio KCMD. The target air-fuel ratio KCMD is calculated by the target air-fuel ratio calculator 16 out of synchronism with the calculation by the adaptive sliding mode controller 19 of the basic air-fuel ratio correction quantity $u_{sl}$, but in synchronism with a crankshaft angle period (so-called TDC) of the internal combustion engine 1, as described later on.

As shown in FIG. 9, the adaptive sliding mode controller 19 also includes, in addition to the calculators 39, 40, a stability decision unit 42 for determining stability of the adaptive sliding mode control process, and a correction limiter 43 (correction quantity calculation limiting means) for limiting correction of the basic air-fuel ratio KBS depending on the determined stability of the adaptive sliding mode control process.

Figure 16:
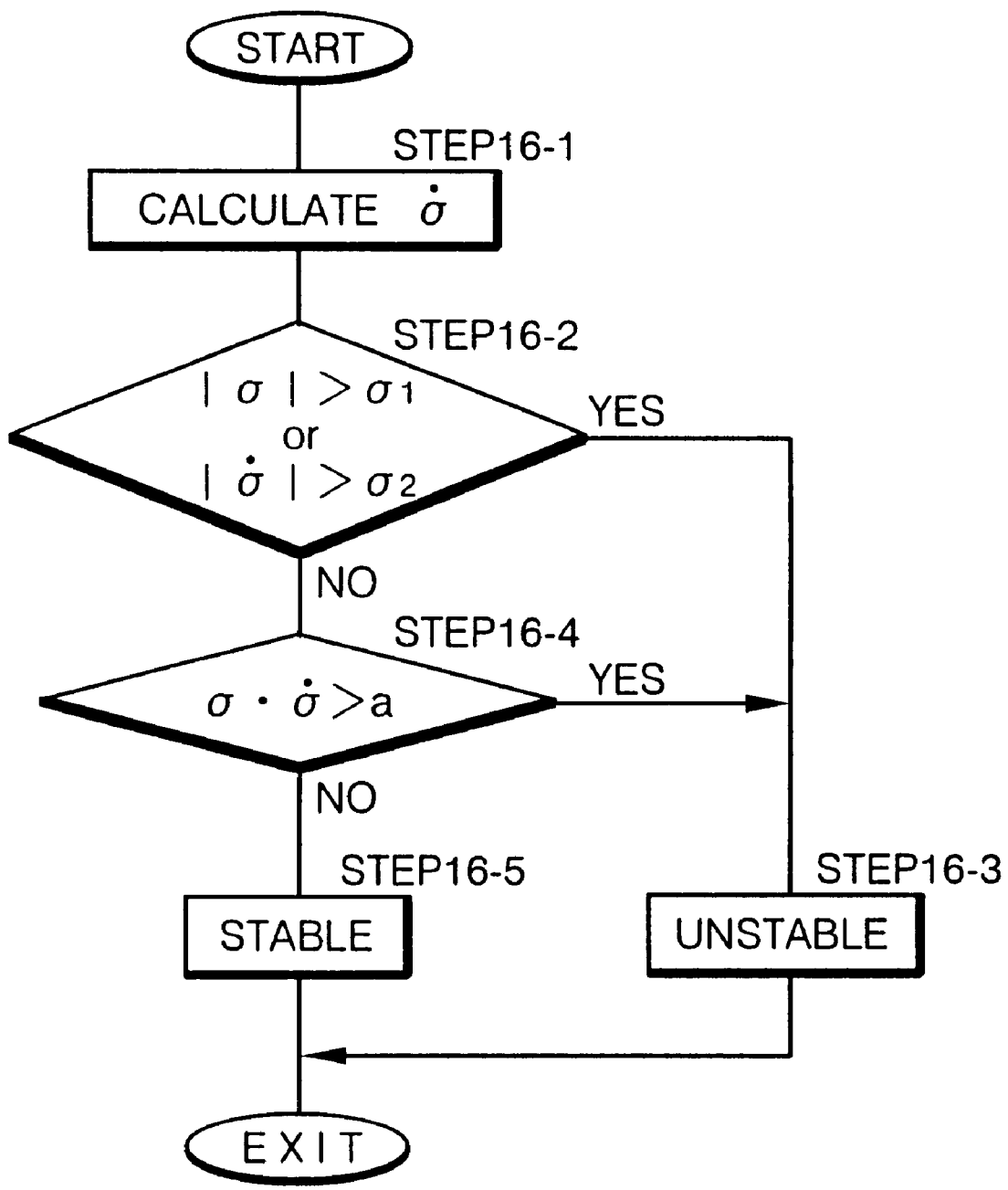
FIG. 16 is a flowchart of an operation sequence of the air-fuel control system shown in FIG. 1.

The stability decision unit 42 carries out a stability decision process shown in FIG. 16 each time the basic air-fuel ratio correction quantity $u_{sl}$ is calculated. As shown in FIG. 16, the stability decision unit 42 first determines a rate of change σ dot over time of the linear function σ (determined by the nonlinear input calculator 40 shown in FIG. 9) expressed by the equation (13), i.e., a differential of the linear function a with respect to time in STEP16-1. The stability decision unit 42 then determines whether the absolute value of the linear function σ is greater than a predetermined value $\sigma_1$ ($|\sigma|>\sigma_1$) or the absolute value of the rate of change σ dot is greater than a predetermined value $\sigma_2$($|\sigma$ dot$|>\sigma_2$) in STEP16-2. If $|\sigma|>\sigma_1$ or $|\sigma$ dot$|>\sigma_2$ (YES in STEP16-2), then the stability decision unit 42 decides that the adaptive sliding mode control process is unstable in STEP16-3, and finishes the present decision cycle. A condition, thus judged as unstable, of the adaptive sliding mode control process is that the estimated state quantities $x_1$ hat, $x_2$ hat are largely spaced apart from the hyperplane (σ=0) or they are subjected to a large time-dependent change in a direction away from the hyperplane (σ=0).

If the condition of STEP16-2 is not met (NO in STEP16-2), then the stability decision unit 42 determines whether the product σ·σ dot of the value of σ and the value of σ dot (which corresponds to a time differential function of the Lyapunov's function $\sigma^2/2$ relative to σ) is greater than a predetermined value a (>0) (σ·σ dot >a) in STEP16-4. If σ·σ dot>a (YES in STEP16-4), then the stability decision unit 42 decides that the adaptive sliding mode control process is unstable in STEP16-3, and finishes the present decision cycle. If the condition of STEP16-4 is not met (NO in STEP16-4), then the stability decision unit 42 decides that the adaptive sliding mode control process is stable in STEP16-5, and finishes the present decision cycle. A condition, thus judged as unstable, of the adaptive sliding mode control process is that the estimated state quantities $x_1$ hat, $x_2$ hat are shifted in a direction away from the hyperplane (σ=0) on a side where $\sigma^2$ increases.

In this embodiment, the adaptive sliding mode control process is determined for stability according to the two conditions in STEP16-2, STEP16-4. However, the adaptive sliding mode control process may be determined for stability according to one of the two conditions in STEP16-2, STEP16-4 or one of the two inequalities in STEP16-2.

Therefore, according to the stability decision process described above, the stability decision unit 42 decides that the adaptive sliding mode control process is unstable when the estimated state quantities $x_1$ hat, $x_2$ hat do not possibly converge onto the hyperplane (σ=0).

If the stability decision unit 42 decides that the adaptive sliding mode control process is unstable, then the correction limiter 43 (see FIG. 9) prevents the outputting of the basic air-fuel ratio correction quantity $u_{sl}$ calculated by the adaptive sliding mode controller 19 in the present cycle time, and keeps the basic air-fuel ratio correction quantity $u_{sl}$ calculated in the preceding cycle time as the output of the adaptive sliding mode controller 19, thereby limiting the correction of the basic air-fuel ratio KBS by the basic air-fuel ratio correction quantity $u_{sl}$.

If the stability decision unit 42 decides that the adaptive sliding mode control process is stable, then the correction limiter 43 outputs the basic air-fuel ratio correction quantity $u_{sl}$ calculated by the adaptive sliding mode controller 19 in the present cycle time.

While the basic air-fuel ratio correction quantity $u_{sl}$ calculated in the preceding cycle time is kept as the output of the adaptive sliding mode controller 19 if the adaptive sliding mode control process is unstable in the illustrated embodiment, the basic air-fuel ratio correction quantity $u_{sl}$ may forcibly be set to "0" thereby keeping the basic air-fuel ratio KBS uncorrected if the adaptive sliding mode control process is unstable.

In the adaptive sliding mode control process according to the present embodiment, when the estimated state quantities $x_1$ hat, $x_2$ hat converge onto the hyperplane (σ=0) expressed by the equation (13) or a nearby region (σ~0), the stability of convergence of the estimated state quantities $x_1$ hat, $x_2$ hat toward the target values "q", "0" (the balanced point on the hyperplane) is higher as the gradient of the hyperplane (σ=0), stated otherwise, the value of the coefficient k (>0) in the equation (13), is greater. This is equivalent to the fact that the system stability is higher as the pole-k of the control system shown in FIG. 8 becomes larger in a negative direction on the real $ax_1$ s. As can be seen from the equation (12), the greater the value of the coefficient k, the shorter the time required for the estimated state quantities $x_1$ hat, $x_2$ hat to converge toward the target values "q", "0" on the hyperplane. From this standpoint, therefore, the coefficient k should preferably be set to as large a value as possible.

If the value of the coefficient k in the equation (13) is too large, however, as long as the estimated state quantities $x_1$ hat, $x_2$ hat do not converge onto the hyperplane (σ=0), the value of the linear function σ is also large as can be understood from the equation (13), and hence the non-linear input $u_{nl}$ ($=u_{rch}+u_{adp}$) for converging the estimated state quantities $x_1$ hat, $x_2$ hat onto the hyperplane is also large. If the nonlinear input $u_{nl}$ is too large, then the estimated state quantities $x_1$ hat, $x_2$ hat tend to produce an oscillatory response with respect to the hyperplane, resulting in an increase in the time required for the estimated state quantities $x_1$ hat, $x_2$ hat to converge onto the hyperplane. Such an increase in the time reduces the stability of convergence and the quick response of the estimated state quantities $x_1$ hat, $x_2$ hat. From this standpoint, therefore, it is not preferable to set the coefficient k to too a large value.

In view of the above considerations, the adaptive sliding mode controller 19 according to this embodiment additionally has a hyperplane variable controller 44 (hyperplane setting means) for varying the value of the coefficient k in the equation (13) thereby to vary the hyperplane of the adaptive sliding mode control process, as shown in FIG. 9.

The hyperplane variable controller 44 varies the hyperplane of the adaptive sliding mode control process in the following manner:

The hyperplane variable controller 44 determines the value of the linear function a from the estimated state quantities $x_1$ hat, $x_2$ hat according to the equation (13) using the present value of the coefficient k, and determines the value of a parameter f which is defined according to the equation (21), given below, depending on the magnitude of the absolute value $|\sigma|$ of the determined linear function σ.

$$f = \begin{cases} 1 \ (|\sigma| \leq \sigma_{limit}) \\ -1 \ (|\sigma| > \sigma_{limit}) \end{cases} \qquad (21)$$

where $\sigma_{limit}$ represents a predetermined threshold for determining whether the linear function σ corresponding to the present estimated state quantities $x_1$ hat, $x_2$ hat is substantially in agreement with the hyperplane (σ=0) or not, i.e., whether the estimated state quantities $x_1$ hat, $x_2$ hat has substantially converged onto the hyperplane ($\sigma=0$) or not.

The hyperplane variable controller 44 integrates the parameter f thus determined in each cycle time of the adaptive sliding mode control process, and determines an integrated value sum(f) as indicated by the following equation (22):

$$\text{sum}(f) = \int_0^t f \, dt \tag{22}$$

and determines the present value of the coefficient k from the integrated value sum(f) according to the following equation (23):

$$k = k_0 \gamma \cdot \text{sum}(f) \tag{23}$$

where $k_0$ represents an initial value (>0) of the coefficient k which defines the hyperplane, and y represents a predetermined gain coefficient for adjusting the rate of change of the value of the coefficient k. The initial value $k_0$ is selected such that the estimated state quantities $x_1$ hat, $x_2$ hat will converge onto the hyperplane ($\sigma=0$) within a shortest time.

The hyperplane variable controller 44 gives the value of the coefficient k thus determined according to the equation (23) as the value of the coefficient k for effecting the aforesaid operations and decision to the equivalent control input calculator 39, the nonlinear input calculator 40, and the stability decision unit 42.

In order to prevent the value of the coefficient k from becoming negative and also from becoming smaller than the initial value $k_0$, if the integrated value sum(f) according to the equation (22) is smaller than "0" (sum(f)<0), then the integrated value sum(f) is forcibly set to "0" to determine the correction coefficient k (in this case $k=k_0$). If the value of the coefficient k is excessively large, then it cannot quickly be reduced when it is to be reduced. To avoid such a defect, if the integrated value sum(f) determined according to the equation (22) becomes larger than a predetermined value $\alpha$, then the integrated value sum(f) in the equation (23) is forcibly set to "$\alpha$" to determine the correction coefficient k (in this case, $k=k_0+\alpha=$an upper limit for the coefficient k).

Figure 10:
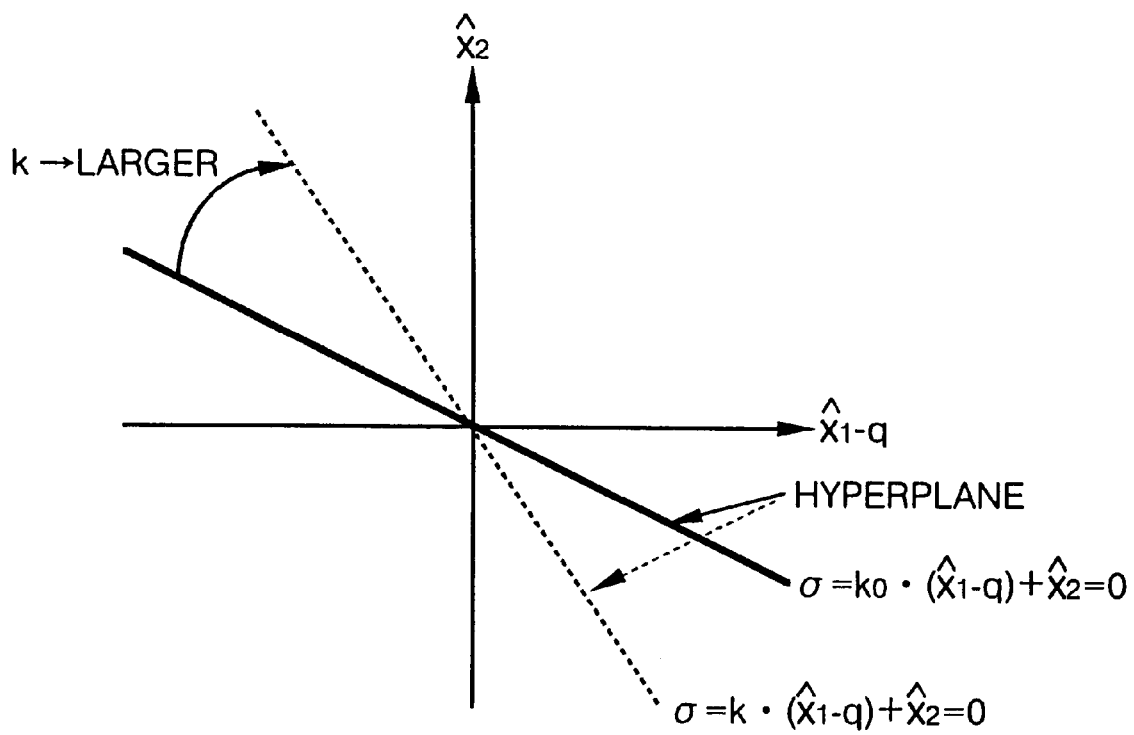
FIG. 10 is a diagram illustrative of a hyperplane used by the adaptive sliding mode controller shown in FIG. 9.

Insofar as the estimated state quantities $x_1$ hat, $x_2$ hat have not converged onto the hyperplane ($\sigma$0), the value of the parameter f in the coefficient k fluctuates in the vicinity of the initial value $k_0$. With the initial value $k_0$ established as described above, it is possible to converge the estimated state quantities $x_1$ hat, $x_2$ hat onto the hyperplane ($\sigma=0$) substantially within a shortest time. When the estimated state quantities $x_1$ hat, $x_2$ hat have converged onto the hyperplane ($\sigma=0$), since the value of the parameter f is substantially steadily fixed to "1", the value of the coefficient k gradually increases. Consequently, when the estimated state quantities $x_1$ hat, $x_2$ hat have substantially converged onto the hyperplane ($\sigma=0$), the hyperplane used in the adaptive sliding control process according to the present embodiment has its gradient progressively increased as shown in FIG. 10, thus increasing the stability of convergence of the estimated state quantities $x_1$ hat, $x_2$ hat toward the target values "q", "0" (the balanced point on the hyperplane) and allowing the estimated state quantities $x_1$ hat, $x_2$ hat to converge toward the target values "q", "0" in a short time (i.e., with an increased response). Progressively increasing the value of the coefficient k is equivalent to moving the pole-k of the control system toward a stable region in a negative direction on the real axis Re on the complex plane shown in FIG. 8.

The manner in which the value of the coefficient k is established to vary the hyperplane is not limited to the process described above, but may be modified in various ways. For example, combinations of "2" and "−1", "1" and "−2", etc. other than "1" and "−1", may be used as the value of the parameter f in the equation (21). Using such combinations, it is possible to vary the rate of change of the hyperplane depending on whether the value of the linear function $\sigma$ substantially coincides with the hyperplane ($\sigma=0$) or not. Alternatively, the value of the parameter f may be given as a function of the value of the linear function $\sigma$ to vary the hyperplane depending on the value of the linear function $\sigma$. Further alternatively, it is also possible to vary the value of $\gamma$ in the equation (23) depending on the direction in which the value determined by the equation (22) varies, i.e., increases or decreases, or to vary the value of $\gamma$ depending on the value of the linear function a. An optimum one of those processes for varying the hyperplane can be selected depending on the object to be controlled, and a specific process of determining the coefficient k may be determined through experimentation or the like in view of the stability of control or the quick response capability.

The details of the adaptive sliding mode control process have been described above.

The adaptive controller 23 of the general feedback controller 20 shown in FIG. 1 will be described below.

As shown in FIG. 1, the general feedback controller 20 effects a feedback control process to converge the air-fuel ratio (the pre-CAT A/F) at the LAF sensor 6 toward the target air-fuel ratio KCMD which is determined by the target air-fuel ratio calculator 16 as described above. If such a feedback control process were carried out under the known PID control, it would be difficult keep stable controllability against dynamic behavioral changes including changes in the operating conditions of the internal combustion engine 1, characteristic changes due to aging of the internal combustion engine 1, etc.

According to the present embodiment, the general feedback controller 20 includes, in addition to the PID controller 22 for carrying out the known PID control process, the adaptive controller 23 for compensating for such dynamic behavioral changes, and switches between the feedback correction coefficients KFB produced respectively by the PID controller 22 and the adaptive controller 23 for performing a feedback control process.

Figure 11:
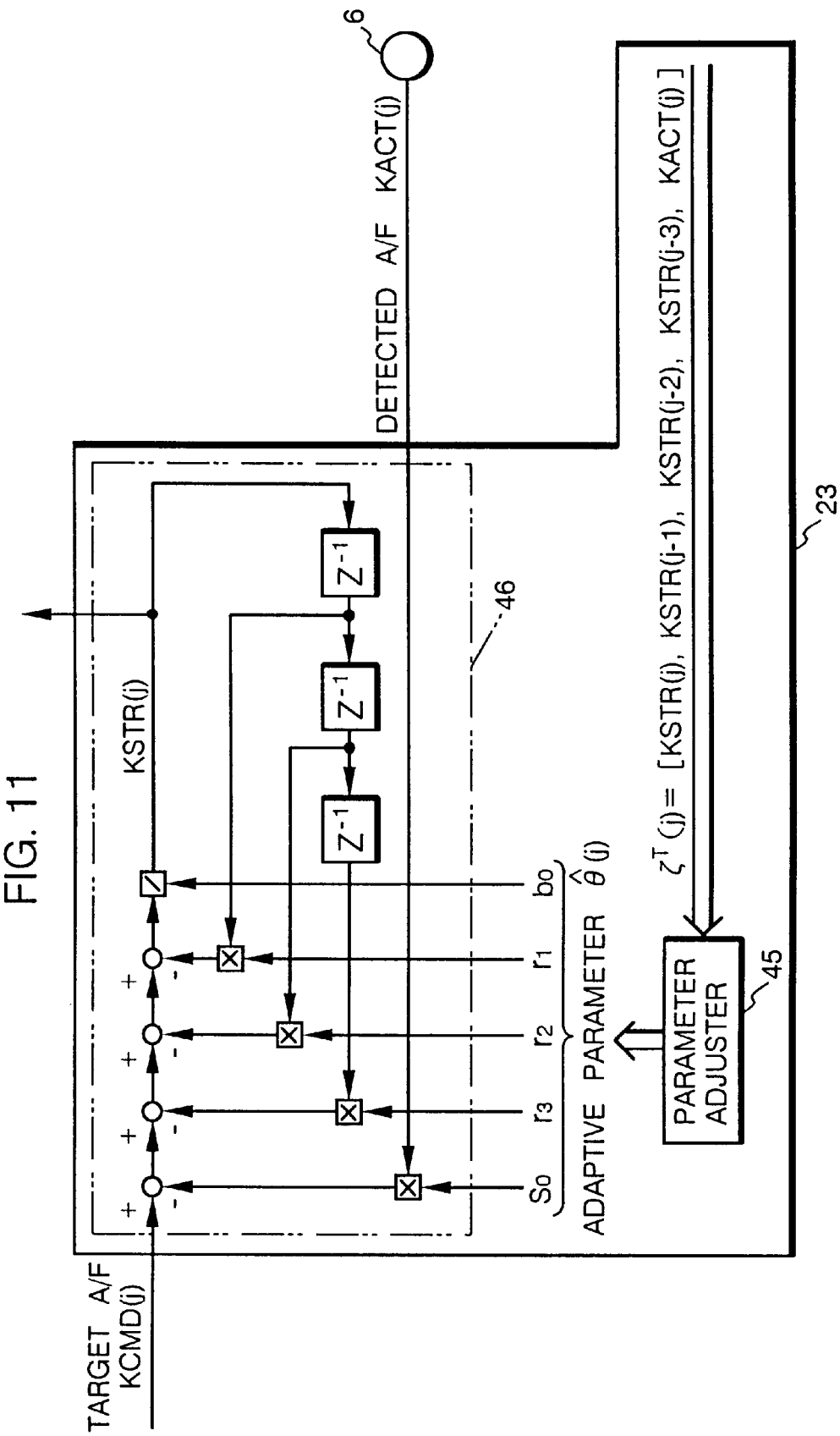
FIG. 11 is a block diagram of an adaptive controller in the air-fuel control system shown in FIG. 1.

As shown in FIG. 11, the adaptive controller 23 comprises a parameter adjuster 45 for establishing a plurality of adaptive parameters using the parameter adjusting law proposed by I. D. Landau, et al., and a correction coefficient calculator 46 for calculating the feedback correction coefficient KSTR using the established adaptive parameters.

The parameter adjuster 45 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (24), (25), given below, an adaptive parameter $\theta$ hat (j) (j indicates the number of a control cycle) established by the parameter adjuster 45 is represented by a vector (transposed vector) according to the equation (26) given below. An input $\zeta$ (j) to the parameter adjuster 45 is expressed by the equation (27) given below. In this embodiment, it is assumed that the internal combustion engine 1, which is an object to be controlled by the feedback controller 20, is considered to be a plant of a first-order system having a dead time $d_p$ corresponding to three control cycles (a time corresponding to three combustion cycles of the internal combustion engine 1), and m=n=1, $d_p$=3, and five adaptive parameters $s_0, r_1, r_2, r_3, b_0$ are established (see FIG. 11). In the upper and middle expressions of the equation (27), $u_s, y_s$ generally represent a control input (manipulating quantity) to the object to be controlled and an output (controlled quantity) from the object to be controlled. Since the control input is the feedback correction coefficient KSTR and the output from the object (the internal combustion engine 1) is the pre-CAT A/F (hereinafter referred to as "KACT") actually detected by the LAF sensor 6 in the illustrated embodiment, the input ζ (j) to the parameter adjuster 45 is expressed by the lower expression of the equation (27) (see FIG. 11).

$$A(Z^{-1}) = 1 + a_1 Z^{-1} + \ldots + a_n Z^{-n} \qquad (24)$$

$$B(Z^{-1}) = b_0 + b_1 Z^{-1} + \ldots + b_m Z^{-m} \qquad (25)$$

$$\hat{\theta}^T(j) = \left[ \hat{b}_0^{-1}(j), \hat{B}_R(Z^{-1}, j), \hat{S}(Z^{-1}, j) \right] \qquad (26)$$
$$= [b_0(j), r_1(j), \ldots, r_{m+d_p-1}(j), s_0(j), \ldots, s_{n-1}(j)]$$
$$= [b_0(j), r_1(j), r_2(j), r_3(j), s_0(j)]$$

$$\zeta^T(j) = [u_s(j), \ldots, u_s(j-m-dp+1), y_s(j), \ldots, y_s(j-n+1)] \qquad (27)$$
$$= [u_s(j), u_s(j-1), u_s(j-2), u_s(j-3), y_s(j)]$$
$$= [KSTR(j), KSTR(j-1), KSTR(j-2), KSTR(j-3), KACT(j)]$$

The adaptive parameter θ hat expressed by the equation (26) is made up of a scalar quantity element $b_0$ hat $^{-1}$(j) for determining the gain of the adaptive controller 23, a control element $B_R$ hat ($Z^{-1}$,j) expressed using a manipulating quantity, and a control element S hat ($Z^{-1}$,j) expressed using a controlled quantity, which are expressed respectively by the following equations (28)–(30) (see the block of the correction coefficient calculator 46 shown in FIG. 11):

$$\hat{b}_0^{-1}(j) = \frac{1}{b_0} \qquad (28)$$

$$\hat{B}_R(Z^{-1}, j) = r_1 Z^{-1} + r_2 Z^{-2} + \ldots + r_{m+d_p-1} Z^{-(n+dp-1)} \qquad (29)$$
$$= r_1 Z^{-1} + r_2 Z^{-2} + r_3 Z^{-3}$$

$$\hat{S}(Z^{-1}, j) = s_0 + s_1 Z^{-1} + \ldots + s_{n-1} Z^{-(n-1)} \qquad (30)$$
$$= s_0$$

The parameter adjuster 45 establishes coefficients of the scalar quantity element and the control elements, described above, and supplies them as the adaptive parameter θ hat expressed by the equation (26) to the correction coefficient calculator 46. The parameter adjuster 45 calculates the adaptive parameter θ hat so that the pre-CAT A/F will agree with the target air-fuel ratio, using the feedback correction coefficient KSTR which is a manipulating quantity from the present to the past and the pre-CAT A/F (=KACT) which is a controlled quantity.

Specifically, the parameter adjuster 45 calculates the adaptive parameter θ hat according to the following equation (31):

$$\hat{\theta}(j) = \hat{\theta}(j-1) + \Gamma(j-1) \cdot \zeta(j-d_p) \cdot e^*(j) \qquad (31)$$

where Γ (j) represents a gain matrix (m+n+$d_p$) for determining a rate of establishing the adaptive parameter θ hat, and e*(j) an estimated error of the adaptive parameter θ hat. Γ (j) and e*(j) are expressed respectively by the following recursive formulas (32), (33):

$$\Gamma(j) = \qquad (32)$$
$$\frac{1}{\lambda_1(j)} \left[ \Gamma(j-1) - \frac{\lambda_2(j) \cdot \Gamma(j-1) \cdot \zeta(j-d_p) \cdot \zeta^T(j-d_p) \cdot \Gamma(j-1)}{\lambda_1(j) + \lambda_2(j) \cdot \zeta^T(j-d_p) \cdot \Gamma(j-1) \cdot \zeta(j-d_p)} \right]$$

where $0 < \lambda_1(j) \leq 1$, $0 < \lambda_2(j) < 2$, Γ(0)>0.

$$e^*(j) = \frac{D(Z^{-1}) \cdot KACT(j) - \hat{\theta}^T(j-1) \cdot \zeta(j-d_p)}{1 + \zeta^T(j-d_p) \cdot \Gamma(j-1) \cdot \zeta(j-d_p)} \qquad (33)$$

where $D(Z^{-1})$ represents an asymptotically stable polynomial for adjusting the convergence. In this embodiment, $D(Z^{-1})$=1.

Various specific algorithms are obtained depending on how $\lambda_1$ (j), $\lambda_2$ (j) in the equation (33) are selected. For example, if $\lambda_1$ (j)=1 and $\lambda_2$ (j)=λ(0<λ<2), then a degressive gain algorithm (a method of least squares if λ=1) is obtained. If $\lambda_1$ (j)=$\lambda_1$ (0<$\lambda_1$<1) and $\lambda_2$ (j)=(0 <$\lambda_2$<λ), then a variable gain algorithm (a method of weighted least squares if $\lambda_2$=1) is obtained. When $\lambda_1$ (j)/$\lambda_2$ (j)=η and $\lambda_3$ is expressed by the equation (34), given below, if $\lambda_1$ (j)=$\lambda_3$, then a fixed trace algorithm is obtained. In the equation (34), "trΓ(0)" represents a trace function of a matrix Γ (0) and is the sum (scalar quantity) of diagonal elements of the matrix Γ (0). If $\lambda_1$(j)=1 and $\lambda_2$(j)=0, a fixed gain algorithm is obtained. In this case, as can be seen from the equation (32), Γ (j)=Γ (j−1), and hence Γ (j) is of a fixed value. Any one of the degressive gain algorithm, the variable gain algorithm, the fixed gain algorithm, and the fixed trace algorithm is suitable for a time-dependent plant such as a fuel injection process, an air-fuel ratio, or the like of the internal combustion engine 1.

$$\lambda_3(j) = 1 - \frac{\|\Gamma(j-1) \cdot \zeta(j-d_p)\|^2}{\eta + \zeta^T(j-d_p) \cdot \Gamma(j-1) \cdot \zeta(j-d_p)} \cdot \frac{1}{tr\Gamma(0)} \qquad (34)$$

Using the adaptive parameter θ hat ($s_0$, $r_1$, $r_2$, $r_3$, $b_0$) established by the parameter adjuster 45 and the target air-fuel ratio KCMD calculated by the target air-fuel ratio calculator 16, the correction coefficient calculator 46 determines the feedback correction coefficient KSTR according to the recursive formula (35) given below.

$$KSTR(j) = \frac{KCMD(j-d') \cdot s_0 \cdot KACT(j) - r_1 \cdot KSTR(j-1) - r_2 \cdot KSTR(j-2) - r_3 \cdot KSTR(j-3)}{b_0} \qquad (35)$$

where "d'" represents a dead time until the pre-CAT A/F corresponding to the target air-fuel ratio KCMD is detected by the LAF sensor 6. In this embodiment, the dead time d" is a time (=4·$d_p$) corresponding to 12 cycles each equal to a crankshaft angle period (so-called TDC).

As is apparent from the foregoing description, the adaptive controller 23 thus constructed is a recursive-type controller taking into account dynamic behavioral changes of the internal combustion engine 1 which is an object to be controlled. Stated otherwise, the adaptive controller 23 is a controller described in a recursive form to compensate for dynamic behavioral changes of the internal combustion engine 1, and more particularly a controller having a recursive-type adaptive parameter adjusting mechanism.

A recursive-type controller of this type may be constructed using an optimum regulator. In such a case, however, it generally has no parameter adjusting mechanism.

The details of the adaptive controller 23 have been described above.

The PID controller 22, which is provided together with the adaptive controller 23 in the general feedback controller 20, calculates a proportional term (P term), an integral term (I term), and a derivative term (D term) from the difference between the pre-CAT A/F detected by the LAF sensor 6 and the target air-fuel ratio KCMD, and calculates the total of those terms as the feedback correction coefficient KLAF, as is the case with the general PID control process. In this embodiment, because the fuel injection quantity is corrected by being multiplied by the feedback correction coefficient KLAF, the feedback correction coefficient KLAF is "1" when the difference between the pre-CAT A/F and the target air-fuel ratio KCMD is "0". Therefore, the integral term (I term) has an initial value of "1". The gains of the proportional term, the integral term, and the derivative term are determined from the rotational speed and intake pressure of the internal combustion engine 1 using a predetermined map.

The switcher 24 of the general feedback controller 20 outputs the feedback correction coefficient KLAF determined by the PID controller 22 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the air-fuel ratio KACT detected by the LAF sensor 6 is not reliable due to a response delay of the LAF sensor 6 as when the target air-fuel ratio KCMD changes largely or immediately after the air-fuel ratio feedback control process has started, or if the internal combustion engine 1 operates highly stably as when it is idling and hence no high-gain control process by the adaptive controller 23 is required. Otherwise, the switcher 24 outputs the feedback correction coefficient KSTR determined by the adaptive controller 23 as the feedback correction coefficient KFB for correcting the fuel injection quantity. This is because the adaptive controller 23 effects a high-gain control process and functions to converge the pre-CAT A/F detected by the LAF sensor 6 quickly toward the target air-fuel ratio KCMD, and if the feedback correction coefficient KSTR determined by the adaptive controller 23 is used when the combustion in the internal combustion engine 1 is unstable or the air-fuel ratio KACT detected by the LAF sensor 6 is not reliable, then the air-fuel ratio control process tends to be unstable.

Such operation of the switcher 24 is disclosed in detail in Japanese patent application No. 7-227303 (Japanese laid-open patent publication No. 8-105345 which corresponds to U.S. Pat. No. 5,558,075), and will not be described in detail below.

Overall operation of the air-fuel ratio control system according to the above embodiment will be described below.

Figure 13:
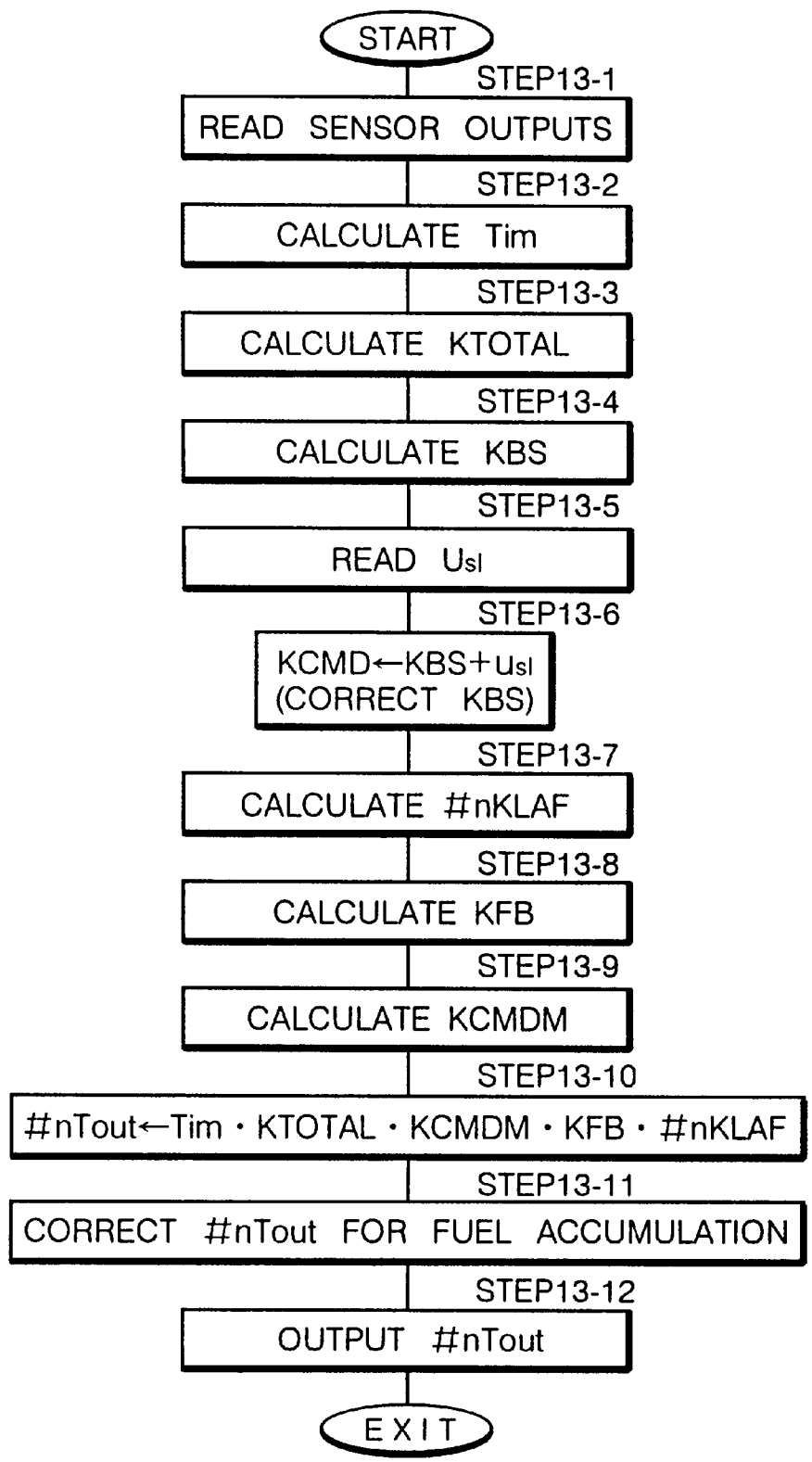
FIG. 13 is a flowchart of an operation sequence of the air-fuel control system shown in FIG. 1.

First, a process of calculating an output fuel injection quantity #nTout (n=1, 2, 3, 4) for each of the cylinders of the internal combustion engine 1 will be described below with reference to FIGS. 1 and 13. The control unit 8 calculates an output fuel injection quantity #nTout (n=1, 2, 3, 4) for each of the cylinders in synchronism with a crankshaft angle period of the internal combustion engine 1 as follows:

Outputs from various sensors including the LAF sensor 6 and the $O_2$ sensor 7 are read in STEP13-1. The basic fuel injection quantity calculator 12 corrects a fuel injection quantity corresponding to the rotational speed and intake pressure of the internal combustion engine 1 with the effective opening area of the throttle valve, thereby calculating a basic fuel injection quantity Tim in STEP13-2. The first correction coefficient calculator 13 calculates a first correction coefficient KTOTAL depending on the coolant temperature and the amount by which the canister is purged in STEP13-3. The basic air-fuel ratio setting unit 15 establishes a basic air-fuel ratio KBS depending on the rotational speed of the internal combustion engine 1 and the intake pressure thereof indicative of a load on the internal combustion engine 1 in STEP13-4.

Then, the target air-fuel ratio calculator 16 reads a basic air-fuel ratio correction quantity $u_{sl}$ which has been calculated by the adaptive sliding mode controller 19 and stored in the non-illustrated memory in STEP13-5, and adds the basic air-fuel ratio correction quantity $u_{sl}$ to the basic air-fuel ratio KBS established in STEP13-4, thereby correcting the basic air-fuel ratio KBS into a target air-fuel ratio KCMD in STEP13-6.

In the local feedback controller 21, the PID controllers 27 calculate respective feedback correction coefficients #nKLAF in order to eliminate variations between the cylinders, based on actual air-fuel ratios #nA/F of the respective cylinders which have been estimated from the output signal of the LAF sensor 6 by the observer 26, in STEP13-7. Then, the general feedback controller 20 calculates a feedback correction coefficient KFB in STEP13-8.

Figure 14:
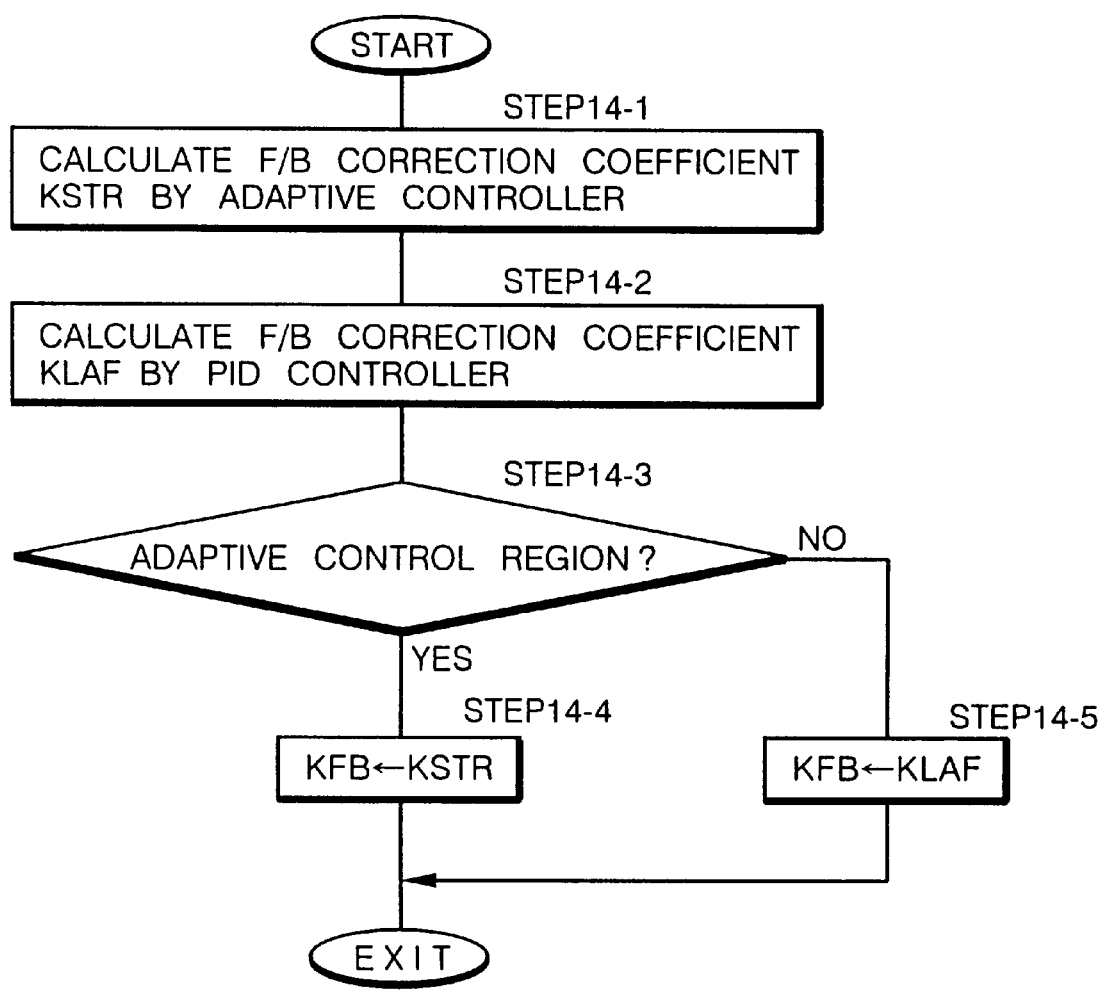
FIG. 14 is a flowchart of an operation sequence of the air-fuel control system shown in FIG. 1.

The general feedback controller 20 calculates a feedback correction coefficient KFB according to a flowchart shown in FIG. 14, using the sensor outputs read in STEP13-1 and the target air-fuel ratio KCMD determine d in STEP13-6. Specifically, as shown in FIG. 14, the adaptive controller 23 and the PID controller 22 determine respective feedback correction coefficients KSTR, KLAF for converging the pre-CAT A/F detected by the LAF sensor 6 toward the target air-fuel ratio KCMD in STEP14-1, STEP14-2. Depending on whether the combustion in the internal combustion engine 1 or the air-fuel ratio detected by the LAF sensor 6 tends to be unstable, the switcher 24 determines whether the internal combustion engine 1 operates in an adaptive control region which demands an adaptive control process or not in STEP14-3. If in the adaptive control region, then the switcher 24 outputs the feedback correction coefficient KSTR determined by the adaptive controller 23 as a feedback correction coefficient KFB for correcting the fuel injection quantity of the internal combustion engine 1 in STEP14-4. If not in the adaptive control region, i.e., if in a PID control region, then the switcher 24 outputs the feedback correction coefficient KLAF determined by the PID controller 22 as a feedback correction coefficient KFB for correcting the fuel injection quantity of the internal combustion engine 1 in STEP14-4.

When switching the feedback correction coefficient KFB from the feedback correction coefficient KLAF to the feedback correction coefficient KSTR, the adaptive controller 23 determines a feedback correction coefficient KSTR in a manner to hold the correction coefficient KFB (=KSTR) to the preceding correction coefficient KFB (=KLAF) as long as in the present cycle time when switching the feedback correction coefficient KFB from th e feedback correction coefficient KSTR to the feedback correction coefficient KLAF, the PID controller 22 calculates a present correction coefficient KLAF in a manner to regard the feedback correction coefficient KLAF determined by itself in the preceding cycle time as the preceding correction coefficient KFB (=KSTR).

Referring back to FIG. 13, after the feedback correction coefficient KFB has been calculated, the second correction coefficient calculator 14 calculates in STEP13-9 a second correction coefficient KCMDM depending on the target air-fuel ratio KCMD determined in STEP13-6.

Then, the control unit 8 multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEP13-10. The output fuel injection quantities #nTout are then corrected for accumulated fuel particles on intake pipe walls of the internal combustion engine 1 by the fuel accumulation corrector 28 in STEP13-11. The corrected output fuel injection quantities #nTout are applied to the nonillustrated fuel injectors of the internal combustion engine 1 in STEP13-12.

In the internal combustion engine 1, the fuel injectors inject fuel into the respective cylinders according to the respective output fuel injection quantities #nTout.

The above calculation of the output fuel injection quantities #nTout and the fuel injection of the internal combustion engine 1 are carried out in successive cycle times synchronous with the crankshaft angle period of the internal combustion engine 1 for controlling the operating conditions thereof in order to converge the pre-CAT A/F detected by the LAF sensor 6 toward the target air-fuel ratio KCMD calculated by the target air-fuel ratio calculator 16. While the feedback correction coefficient KSTR determined by the adaptive controller 23 is being used as the feedback correction coefficient KFB, the pre-CAT A/F is quickly converged toward the target air-fuel ratio KCMD with high stability against behavioral changes such as changes in the operating conditions of the internal combustion engine 1 or characteristic changes thereof.

Figure 15:
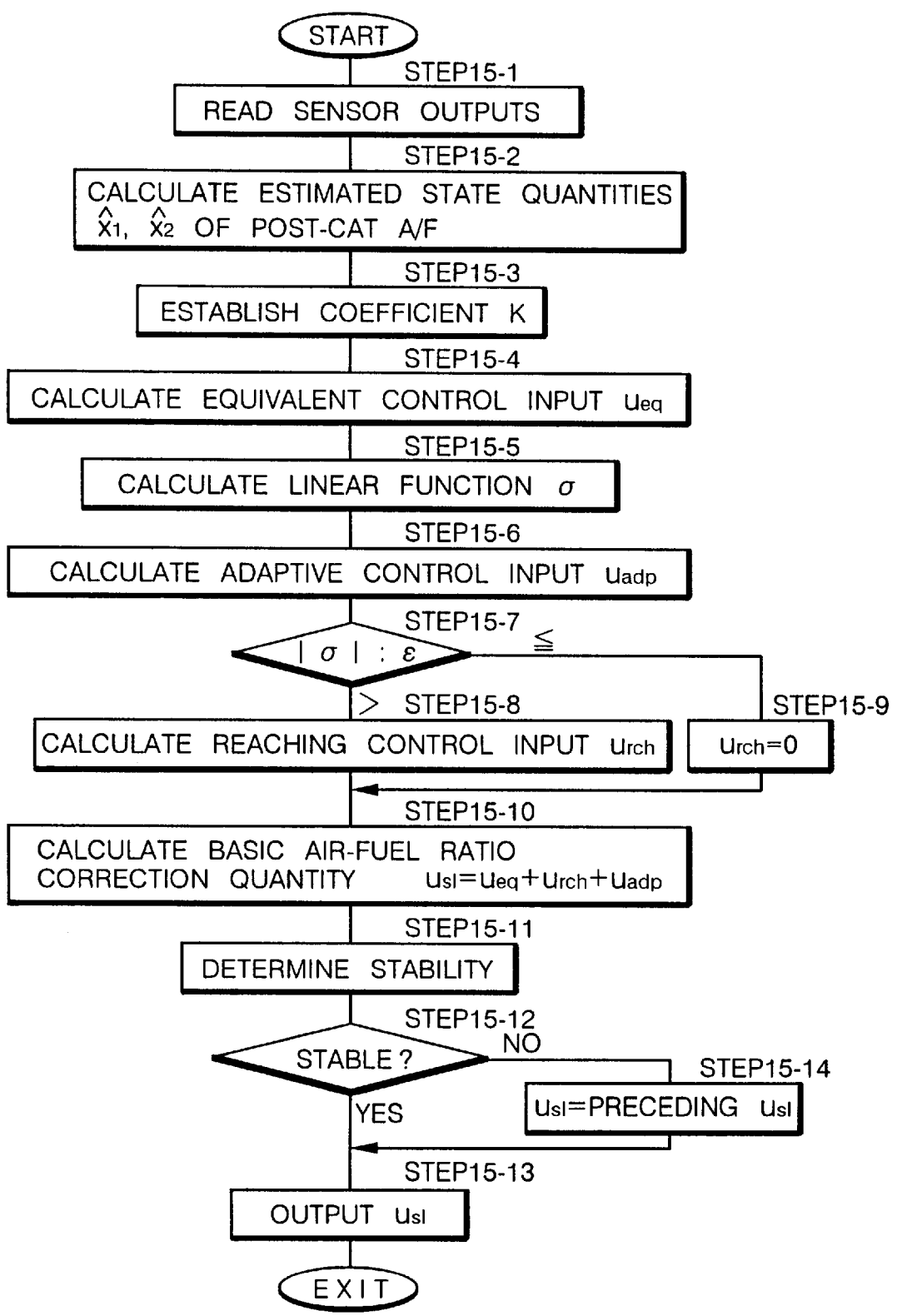
FIG. 15 is a flowchart of an operation sequence of the air-fuel control system shown in FIG. 1.

The basic air-fuel ratio correction quantity $u_{sl}$ read and stored in STEP13-5 is determined in each of cycle times of a predetermined constant period according to a flowchart shown in FIG. 15.

As shown in FIGS. 6, 9f and 15, after outputs from the LAF sensor 6 and the $O_2$ sensor 7 are read in STEP15-1, the state predictor 18 determines estimated state quantities $x_1$ hat, $x_2$ hat (an estimated value of the post-CAT A/F and an estimated value of a change or rate of change of the post-CAT A/F) of the post-CAT A/F after the dead time d in the object exhaust system A according to the equations (2), (3) in STEP15-2.

Then, in the adaptive sliding mode controller 19, the hyperplane variable controller 44 establishes a value of the coefficient k in STEP15-3, and thereafter the equivalent control input calculator 39 calculates an equivalent control input $u_{eq}$ according to the equation (17) in STEP15-4. The nonlinear input calculator 40 then calculates a value of the linear function σ according to the equation (13) in STEP15-5, and calculates an adaptive control input $u_{adp}$ (adaptive control law term) according to the equation (19) in STEP15-6.

The nonlinear input calculator 40 compares the absolute value of the linear function σ with a predetermined small value ε in STEP15-7. If |σ|>ε, then the nonlinear input calculator 40 calculates a reaching control input $u_{rch}$ (reaching control law term) according to the equation (18) in STEP15-8. If |σ|≦ε, i.e., if the estimated state quantities $x_1$ hat, $x_2$ hat have substantially converged onto the hyperplane, then the nonlinear input calculator 40 forcibly sets the reaching control input $u_{rch}$ to "0" in STEP15-9.

Then, the nonlinear input calculator 40 calculates a basic air-fuel ratio correction quantity $u_{sl}$ from the equivalent control input $u_{eq}$, the reaching control input $u_{rch}$, and the adaptive control input $u_{adp}$ according to the equation (20) in STEP15-10.

The stability decision unit 42 determines stability of the adaptive sliding mode control process according to the flowchart shown in FIG. 16 in STEP15-11. If the adaptive sliding mode control process is stable (YES in STEP15-12), then the adaptive sliding mode controller 19 outputs the basic air-fuel ratio correction quantity $u_{sl}$ determined in STEP15-10 through the correction limiter 43 in STEP15-13. If the adaptive sliding mode control process is unstable (NO in STEP15-12), then the adaptive sliding mode controller 19 uses the basic air-fuel ratio correction quantity $u_{sl}$ determined in the preceding cycle time as a present basic air-fuel ratio correction quantity $u_{sl}$ in STEP15-14, and outputs the basic air-fuel ratio correction quantity $u_{sl}$ in STEP15-13. The basic air-fuel ratio correction quantity $u_{sl}$ outputted in STEP15-13 is stored in the non-illustrated memory. The stored basic air-fuel ratio correction quantity $u_{sl}$ is read in STEP13-5 shown in FIG. 13 for use in calculating the target air-fuel ratio KCMD. A process of reading the stored basic air-fuel ratio correction quantity $u_{sl}$ will be described later on.

The basic air-fuel ratio correction quantity $u_{sl}$ thus determined by the adaptive sliding mode controller 19 is determined so as to converge the post-CAT A/F detected by the $O_2$ sensor 7 toward the predetermined adequate value q as described above. Therefore, the pre-CAT A/F is feedback-controlled by the feedback controller 17 at the target air-fuel ratio KCMD which has been corrected from the basic air-fuel ratio KBS by the basic air-fuel ratio correction quantity $u_{sl}$ for thereby controlling the post-CAT A/F at the adequate value q under the feedback control by the feedback controller 17.

The adaptive sliding mode control process carried out by the adaptive sliding mode controller 19 has such characteristics that insofar as the state quantities (the value of the post-CAT A/F and its change or rate of change) of the post-CAT A/F to be adjusted to the predetermined adequate value q are converged onto the hyperplane, the state quantities can stably be converged toward a balanced point (a point of convergence) on the hyperplane by the equivalent control input $u_{eq}$ without being affected by disturbances and a model error of the object to be controlled. Therefore, as long as the state quantities of the post-CAT A/F are converged onto the hyperplane, the post-CAT A/F can be adjusted to the adequate value q irrespective of changes in the operating conditions of the internal combustion engine 1 and aging of the catalytic converter 4.

In this embodiment, the adaptive sliding mode control process which takes disturbances, a model error, etc. into account using the adaptive control law is employed for converging the state quantities of the post-CAT A/F onto the hyperplane. Therefore, at a stage in which the state quantities of the post-CAT A/F have not converged onto the hyperplane, the state quantities can stably be converged onto the hyperplane while assuming the effect of disturbances, a model error, etc. as being very small.

The object exhaust system A which is an object to be controlled by the adaptive sliding mode control process generally contains a relatively long dead time d, which tends to induce control instability. According to the present embodiment, however, in determining the basic air-fuel ratio correction quantity $u_{sl}$ in the adaptive sliding mode control process, the state quantities of the post-CAT A/F detected on a real-time basis by the $O_2$ sensor 7 are not used as they are, but the estimated state quantities $x_1$ hat, $x_2$ hat produced by compensating for the dead time d with the state predictor 18 are used. Consequently, once the estimated state quantities $x_1$ hat, $x_2$ hat converge onto the hyperplane, an estimation error of the estimated state quantities $x_1$ hat, $x_2$ hat is absorbed due to the intrinsic characteristics of the adaptive sliding mode control process.

Therefore, the air-fuel ratio control system according to the present embodiment can adjust the post-CAT A/F highly accurately to the appropriate value q regardless of changes in the operating conditions of the internal combustion engine 1, aging of the catalytic converter 4, disturbances, a model error, etc., for thereby controlling the air-fuel ratio of the internal combustion engine 1 at an air-fuel ratio which allows the catalytic converter 4 to maximize its exhaust gas purifying capability. As a result, an optimum emission control ability can be maintained for the internal combustion engine 1.

Furthermore, the hyperplane variable controller 44 varies the coefficient k which defines the hyperplane thereby to vary the hyperplane depending on the manner in which the estimated state quantities $x_1$ hat, $x_2$ hat converge onto the hyperplane. Consequently, the estimated state quantities $x_1$ hat, $x_2$ hat can converge onto the hyperplane stably within a short period of time, and even after the estimated state quantities $x_1$ hat, $x_2$ hat have converged onto the hyperplane, the estimated state quantities $x_1$ hat, $x_2$ hat can converge toward a balanced point on the hyperplane, i.e., a point of convergence where $x_1$ hat=q and $x_2$ hat=0, stably within a short period of time. Therefore, the post-CAT A/F can be adjusted quickly to the appropriate value q within a short convergence time (with a highly quick response) and with high stability.

In this embodiment, the calculation of the output fuel injection quantities #nTout, including the calculation of the correction coefficients and the calculation of the target air-fuel ratio, by the feedback controller 17 is carried out in synchronism with the crankshaft angle period as it needs to be synchronism with the rotation of the internal combustion engine 1. Therefore, the output fuel injection quantities #nTout are calculated not at regular time intervals but irregular time intervals, as shown in an upper portion of FIG. 12.

Figure 12:
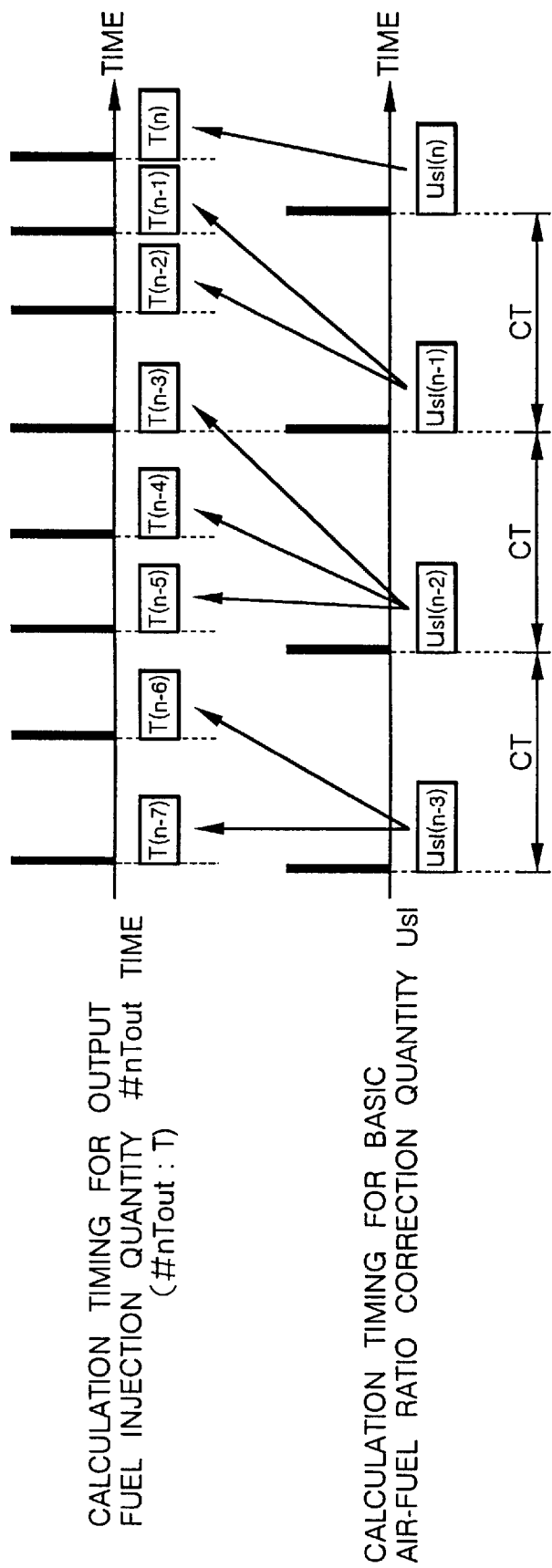
FIG. 12 is a diagram illustrative of the timing to calculate an output fuel injection quantity and a basic air-fuel ratio correction quantity in the air-fuel control system shown in FIG. 1.

The adaptive sliding mode controller 19 calculates the basic air-fuel ratio correction quantity $u_{sl}$ in successive cycle times each having a given period CT as shown in a lower portion of FIG. 12, and stores the calculated basic air-fuel ratio correction quantity $u_{sl}$ in the non-illustrated memory. The basic air-fuel ratio correction quantity $u_{sl}$ stored in the memory is updated each time a basic air-fuel ratio correction quantity $u_{sl}$ is newly determined. Thus, the basic air-fuel ratio correction quantity $u_{sl}$ is calculated and stored at times out of synchronism with the calculation of the output fuel injection quantities #nTout. In this embodiment, the period CT at which the basic air-fuel ratio correction quantity $u_{sl}$ is calculated is longer than the crankshaft angle period at which each of the output fuel injection quantities #nTout is calculated.

Because the basic air-fuel ratio correction quantity $u_{sl}$ is calculated out of synchronism with the calculation of the output fuel injection quantities #nTout, the target air-fuel ratio KCMD is calculated using the basic air-fuel ratio correction quantity $u_{sl}$ and furthermore the output fuel injection quantities #nTout are calculated according to a process described below.

As shown in FIG. 12, for calculating the target air-fuel ratio KCMD and furthermore the output fuel injection quantities #nTout, the last basic air-fuel ratio correction quantity $u_{sl}$ which has previously been calculated by the adaptive sliding mode controller 19 and stored in the memory is used. If the timing of the calculation of the output fuel injection quantities #nTout and the timing of the calculation of the basic air-fuel ratio correction quantity $u_{sl}$ happen to coincide with each other, then the basic air-fuel ratio correction quantity $u_{sl}$ which has already been stored in the memory is used to calculate the output fuel injection quantities #nTout, and thereafter a newly determined basic air-fuel ratio correction quantity $u_{sl}$ is stored in the memory.

Since the basic air-fuel ratio correction quantity $u_{sl}$ and the output fuel injection quantities #nTout are calculated in respective cycle times independent of each other, the adaptive sliding mode controller 19 and the feedback controller 17 can perform calculations in respective cycle times which match their respective control characteristics and the object to be controlled. In particular, the basic air-fuel ratio correction quantity $u_{sl}$ is calculated by the adaptive sliding mode controller 19 in cycle times each having a relatively long period CT corresponding to the relatively long dead time d present in the object exhaust system A and the response delay time thereof. Since $d_M$ in the equation ($_3$) may be constant if the cycle times are constant, any burden on the adaptive sliding mode controller 19 for calculations can be reduced, and the adaptive sliding mode controller 19 can calculate basic air-fuel ratio correction quantity $u_{sl}$ with high accuracy without calculation errors. As a consequence, the post-CAT A/F can be adjusted to the appropriate value q highly accurately.

A simulation process effected on the air-fuel control system shown in FIG. 1 and a conventional air-fuel control system will be described below.

When a disturbance L as shown in FIG. 17(a) was applied to the pre-CAT A/F, the ability of the air-fuel control system shown in FIG. 1 to converge the post-CAT A/F was simulated. The result of the simulated post-CAT A/F for the air-fuel control system shown in FIG. 1 is shown in FIG. 17(b). The ability of a conventional air-fuel control system, which determines a basic air-fuel ratio correction quantity using the conventional PID control process, to converge the post-CAT A/F was also simulated. The result of the simulated post-CAT A/F for the conventional air-fuel control system is shown in FIG. 17(c).

In the air-fuel control system shown in FIG. 1, as can be seen from FIG. 17(b), the post-CAT A/F was adjusted highly accurately to the appropriate value q within a short period of time independently of the disturbance L.

In the conventional air-fuel control system, as can be seen from FIG. 17(c), the post-CAT A/F fluctuated across the appropriate value q and did not converge toward the appropriate value q with high accuracy.

It can be seen from the results of the simulation process shown in FIGS. 17(a) through 17(c) that the air-fuel control system according to the present embodiment is capable of adjusting the post-CAT A/F highly accurately to the appropriate value q within a short period of time independently of the disturbance because the adaptive sliding mode control process is used to calculate the basic air-fuel ratio correction quantity.

Figure 18:
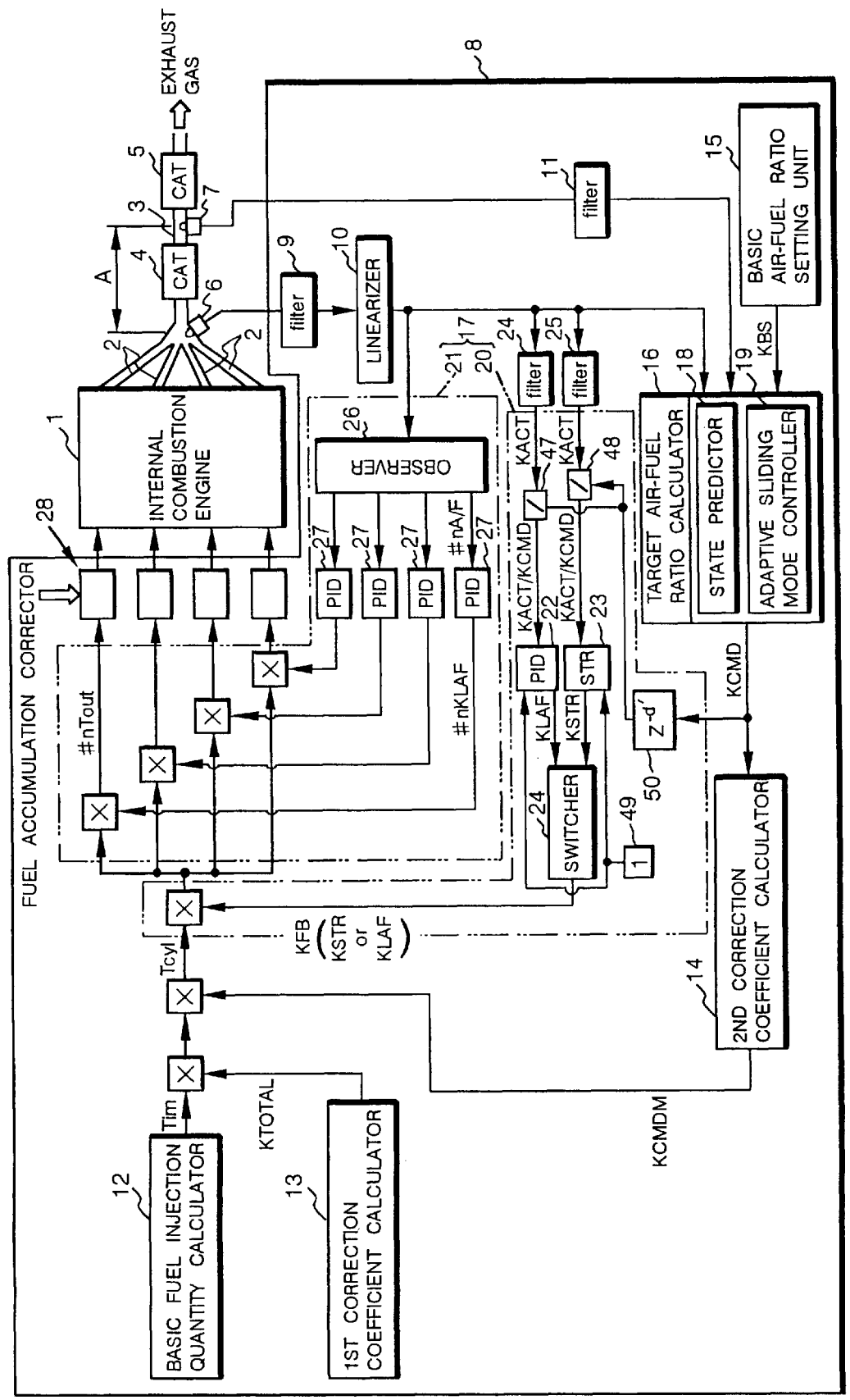
FIG. 18 is a block diagram of an air-fuel control system for an internal combustion engine according to another embodiment of the present invention.

An air-fuel control system according to another embodiment of the present invention will be described below with reference to FIG. 18. The air-fuel control system shown in FIG. 18 is similar to the air-fuel control system shown in FIG. 1 except for certain components. Those parts of the air-fuel control system shown in FIG. 18 which are identical to those of the air-fuel control system shown in FIG. 1 are denoted by identical reference numerals and representations, and will not be described in detail below.

As shown in FIG. 18, the air-fuel control system according to the other embodiment differs from the air-fuel control system shown in FIG. 1 with respect to the general feedback controller 20. The general feedback controller 20 has, in addition to the PID controller 22, the adaptive controller 23, and the switcher 24 which are identical to those shown in FIG. 1, dividers 47, 48 for dividing the pre-CAT A/F (=KACT) produced from the LAF sensor 6 through the filters 24, 25 by the target air-fuel ratio KCMD calculated by the target air-fuel ratio calculator 16, i.e., for determining a ratio KACT/KCMD between the pre-CAT A/F and the target air-fuel ratio KCMD, and a target value setting unit 49 for establishing a target value (=1) for the ratio KACT/KCMD. For determining the ratio KACT/KCMD with the dividers 47, 48, since there is a dead time d' (expressed by the equation (35)) between the pre-CAT A/F (=KACT) produced from the LAF sensor 6 and the target air-fuel ratio KCMD calculated by the target air-fuel ratio calculator 16, the dividers 47, 48 are supplied with the target air-fuel ratio KCMD through a time adjuster 50 which adjusts the dead time d'.

The ratio KACT/KCMD determined by the dividers 47, 48 is supplied to the PID controller 22 and the adaptive controller 23, and the target value (=1) for the ratio KACT/

KCMD is supplied from the target value setting unit 49 to the PID controller 22 and the adaptive controller 23. The PID controller 22 and the adaptive controller 23 determine the respective feedback correction coefficients KLAF, KSTR so as to equalize the ratio KACT/KCMD with the target value (=1). The adaptive controller 23 determines the feedback correction coefficient KSTR according to a recursive formula that is similar to the equation (35) except that "KCMD(j-d")" and "KACT(j)" are replaced respectively with "1" and "KACT/KCMD".

Other details of the air-fuel control system shown in FIG. 18 are identical to those of the air-fuel control system shown in FIG. 1.

In the air-fuel control system shown in FIG. 18, the general feedback controller 20 of the above structure determines the feedback correction coefficient KFB (=KLAF or KSTR) such that the ratio KACT/KCMD between the target air-fuel ratio KCMD corrected according to the adaptive sliding mode control process and the pre-CAT A/F detected by the LAF sensor 6 will be equalized to "1", i.e., the target air-fuel ratio KCMD will be equalized to the pre-CAT A/F. Consequently, the air-fuel control system shown in FIG. 18 offers the same advantages as those of the air-fuel control system shown in FIG. 1. Furthermore, since the target value used for the general feedback controller 20 to determine the feedback correction coefficient KFB is fixed to "1", the control process of the general feedback controller 20 is stabler than if the target air-fuel ratio KCMD (which varies from time to time) is used as a target value as is the case with the air-fuel control system shown in FIG. 1. Especially, the adaptive controller 23 of the general feedback controller 20 is made much stabler because changes in the adaptive parameter θ are reduced by the fixed target value.

In the embodiment shown in FIG. 18, the ratio KACT/KCMD between the target air-fuel ratio KCMD and the pre-CAT A/F detected by the LAF sensor 6 is converged toward the target value of "1". However, a difference between the target air-fuel ratio KCMD and the pre-CAT A/F detected by the LAF sensor 6 may be determined, and the general feedback controller 20 may operate to eliminate the difference (with a target value for the difference being set to "0"). Moreover, the detected pre-CAT A/F may be corrected directly by the output $u_{sl}$ of the adaptive sliding mode controller 19, and the general feedback controller 20 may operate to equalize the corrected pre-CAT A/F to a separately established target value.

In each of the above embodiments, the wide-range air-fuel ratio sensor (LAF sensor) 6 is used as the first exhaust gas sensor. However, the first exhaust gas sensor may comprise an ordinary $O_2$ sensor or any of various other sensors provided it can detect the air-fuel ratio of an exhaust gas.

Furthermore, in each of the above embodiments, the oxygen concentration sensor ($O_2$ sensor) is used as the second exhaust gas sensor. However, the second exhaust gas sensor may comprise any of various other sensors provided it can detect the concentration of a certain component of an exhaust gas downstream of the catalytic converter. For example, if carbon monoxide (CO) contained in an exhaust gas downstream of the catalytic converter is to be controlled, then a CO sensor may be used as the second exhaust gas sensor. If nitrogen oxides (NOx) contained in an exhaust gas downstream of the catalytic converter are to be controlled, then an NOx sensor may be used as the second exhaust gas sensor. If hydrocarbon (HC) contained in an exhaust gas downstream of the catalytic converter is to be controlled, then an HC sensor may be used as the second exhaust gas sensor. If a three-way catalytic converter is used, then the concentration of either one of the gas components described above may be detected to maximize the exhaust gas purifying capability of the catalytic converter. If a reducing or oxidizing catalytic converter is used, then its exhaust gas purifying capability can be increased by directly detecting a gas component to be purified.

Although certain preferred embodiments of the present invention have been shown and described in detail, it should be understood that various changes and modifications may be made therein without departing from the scope of the appended claims.

What is claimed is:

1. An air-fuel control system for use with an internal combustion engine, comprising:
    a catalytic converter disposed in an exhaust system of the internal combustion engine, for purifying an exhaust gas emitted from the internal combustion engine;
    a first exhaust gas sensor disposed in said exhaust system for detecting an air-fuel ratio of the exhaust gas upstream of said catalytic converter;
    a second exhaust gas sensor disposed in said exhaust system for detecting the concentration of a component of the exhaust gas which has passed through said catalytic converter;
    correction quantity calculating means for determining a correction quantity to correct an air-fuel ratio of the internal combustion engine based on an output from said second exhaust gas sensor;
    control means for controlling the air-fuel ratio of the internal combustion engine based on the correction quantity determined by said correction quantity calculating means and an output from said first exhaust gas sensor;
    wherein said air-fuel control system includes;
    state predicting means for estimating the concentration of the component of the exhaust gas downstream of said catalytic converter after a dead time present in the exhaust system including said catalytic converter between the first and second exhaust gas sensors, based on plural outputs up to present from said first gas sensor and on plural outputs up to present from said second gas sensor; and
    said correction quantity calculating means determines the correction quantity of the air-fuel ratio so as to equalize the concentration of the component of the exhaust gas downstream of said catalytic converter to a predetermined appropriate value, based on the concentration of the component estimated by said state predicting means;
    said control means for controlling the air-fuel ratio of the internal combustion engine based on the correction quantity determined by said correction quantity calculating means so as to converge the concentration of the component of the exhaust gas downstream of said catalytic converter toward said predetermined appropriate value.

2. An air-fuel control system according to claim 1, wherein said predetermined appropriate value is determined as a value to maximize an exhaust gas purifying capability of said catalytic converter.

3. An air-fuel control system according to claim 1, wherein said second exhaust gas sensor comprises an oxygen concentration sensor.

4. An air-fuel control system according to claim 1, further comprising:
    target air-fuel ratio calculating means for calculating a target air-fuel ratio for the exhaust gas upstream of said catalytic converter to converge said concentration of the component toward said predetermined appropriate value, depending on said correction quantity determined by said correction quantity calculating means; and feedback control means for controlling a rate at which fuel is supplied to the internal combustion engine so as to converge the air-fuel ratio, detected by said first exhaust gas sensor, of the exhaust gas upstream of said catalytic converter toward said target air-fuel ratio calculated by said target air-fuel ratio calculating means;

whereby the air-fuel ratio of said internal combustion engine can be controlled to converge the concentration of the component of the exhaust gas downstream of said catalytic converter toward said predetermined appropriate value by controlling the rate at which fuel is supplied to the internal combustion engine with said feedback control means.

5. An air-fuel control system according to claim 4, wherein said target air-fuel ratio calculating means comprises mean for calculating said target air-fuel ratio by correcting a basic air-fuel ratio, determined depending on operating conditions of said internal combustion engine, of the exhaust gas upstream of said catalytic converter, with said correction quantity determined by said correction quantity calculating means.

6. An air-fuel control system according to claim 5, wherein said operating conditions of said internal combustion engine include at least a rotational speed and/or a load of the internal combustion engine.

7. An air-fuel control system for use with an internal combustion engine, comprising:
a catalytic converter disposed in an exhaust system of the internal combustion engine, for purifying an exhaust gas emitted from the internal combustion engine;
a first exhaust gas sensor disposed in said exhaust system for detecting an air-fuel ratio of the exhaust gas upstream of said catalytic converter;
a second exhaust gas sensor disposed in said exhaust system for detecting the concentration of a component of the exhaust gas which has passed through said catalytic converter, downstream of said catalytic converter;
correction quantity calculating means for determining a correction quantity to correct an air-fuel ratio of the internal combustion engine based on an output from said second exhaust gas sensor so as to equalize the concentration of the component of the exhaust gas downstream of said catalytic converter to a predetermined appropriate value;
control means for controlling the air-fuel ratio of the internal combustion engine based on the correction quantity determined by said correction quantity calculating means and an output from said first exhaust gas sensor so as to converge the concentration of the component of the exhaust gas downstream of said catalytic converter toward said predetermined appropriate value; and
state predicting means for estimating the concentration, detected by said second exhaust gas sensor, of the component of the exhaust gas downstream of said catalytic converter after a dead time present in an exhaust system including said catalytic converter between the first and second exhaust gas sensors, based on outputs up to present from said first exhaust gas sensor and said second exhaust gas sensor;
said correction quantity calculating means comprising means for determining the air-fuel ratio of the internal combustion engine so as to equalize the concentration of the component to said predetermined appropriate value, based on the concentration, estimated by said state predicting means, of the component of the exhaust gas downstream of said catalytic converter,
wherein said state predicting means comprises means for modeling the exhaust system including said catalytic converter between the first and second exhaust gas sensors as a model including a delay element of at least second order which has an input represented by the air-fuel ratio of the exhaust gas detected by said first exhaust gas sensor and an output represented by the concentration of the component sensor detected by said second exhaust gas sensor, and for estimating the concentration of the component of the exhaust gas downstream of said catalytic converter based on said model on the assumption that the air-fuel ratio up to present of the exhaust gas detected by said first exhaust gas sensor is applied as the input to the model after elapse of said dead time.

8. An air-fuel control system according to claim 7, further comprising:
target air-fuel ratio calculating means for calculating a target air-fuel ratio for the exhaust gas upstream of said catalytic converter to converge said concentration of the component toward said predetermined appropriate value, depending on said correction quantity determined by said correction quantity calculating means; and
feedback control means for controlling a rate at which fuel is supplied to the internal combustion engine so as to converge the air-fuel ratio, detected by said first exhaust gas sensor, of the exhaust gas upstream of said catalytic converter toward said target air-fuel ratio calculated by said target air-fuel ratio calculating means;

whereby the air-fuel ratio of said internal combustion engine can be controlled to converge the concentration of the component of the exhaust gas downstream of said catalytic converter toward said predetermined appropriate value by controlling the rate at which fuel is supplied to the internal combustion engine with said feedback control means.

9. An air-fuel control system according to claim 8, wherein said target air-fuel ratio calculating means comprises mean for calculating said target air-fuel ratio by correcting a basic air-fuel ratio, determined depending on operating conditions of said internal combustion engine, of the exhaust gas upstream of said catalytic converter, with said correction quantity determined by said correction quantity calculating means.

10. An air-fuel control system according to claim 9, wherein said operating conditions of said internal combustion engine include at least a rotational speed and/or a load of the internal combustion engine.

11. An air-fuel control system according to claim 7, wherein said model includes as said delay element a spring and a damper for damping vibrations of said spring, and represents a spring mass system in which a vibration force applied to said spring is expressed by the air-fuel ratio of the exhaust gas upstream of said catalytic converter and a length of said spring is expressed by a quantity indicative of said concentration of the component downstream of said catalytic converter.

12. An air-fuel control system for use with an internal combustion engine, comprising:
a catalytic converter disposed in an exhaust system of the internal combustion engine, for purifying an exhaust gas emitted from the internal combustion engine;
a first exhaust gas sensor disposed in said exhaust system for detecting an air-fuel ratio of the exhaust gas upstream of said catalytic converter;

a second exhaust gas sensor disposed in said exhaust system for detecting the concentration of a component of the exhaust gas which has passed through said catalytic converter, downstream of said catalytic converter;

correction quantity calculating means for determining a correction quantity to correct an air-fuel ratio of the internal combustion engine based on an output from said second exhaust gas sensor so as to equalize the concentration of the component of the exhaust gas downstream of said catalytic converter to a predetermined appropriate value;

control means for controlling the air-fuel ratio of the internal combustion engine based on the correction quantity determined by said correction quantity calculating means and an output from said first exhaust gas sensor so as to converge the concentration of the component of the exhaust gas downstream of said catalytic converter toward said predetermined appropriate value; and state predicting means for estimating the concentration, detected by said second exhaust gas sensor, of the component of the exhaust gas downstream of said catalytic converter after a dead time present in an exhaust system including said catalytic converter between the first and second exhaust gas sensors, based on outputs up to present from said first exhaust gas sensor and said second exhaust gas sensor;

said correction quantity calculating means comprising means for determining the air-fuel ratio of the internal combustion engine so as to equalize the concentration of the component to said predetermined appropriate value, based on the concentration, estimated by said state predicting means, of the component of the exhaust gas downstream of said catalytic converter, wherein said correction quantity calculating means includes sliding mode control means for determining the correction quantity to correct the air-fuel ratio of the internal combustion engine according to a sliding mode control process.

13. An air-fuel control system according to claim 12, wherein said sliding mode control means comprises means for determining the correction quantity to correct the air-fuel ratio of the internal combustion engine according to an adaptive sliding mode control process.

14. An air-fuel control system according to claim 13, wherein said sliding mode control means comprises means for modeling the exhaust system including said catalytic converter between the first and second exhaust gas sensors as a model including a delay element of at least second order which has an input represented by the air-fuel ratio of the exhaust gas detected by said first exhaust gas sensor and an output represented by the concentration, estimated by said state predicting means, of the component of the exhaust gas downstream of said catalytic converter, and for determining the correction quantity to correct the air-fuel ratio of the internal combustion engine so as to equalize the out-put of said model to said predetermined appropriate value, according to the adaptive sliding mode control process.

15. An air-fuel control system according to claim 14, wherein said model includes as said delay element a spring and a damper for damping vibrations of said spring, and represents a spring mass system in which a vibration force applied to said spring is expressed by the air-fuel ratio of the exhaust gas upstream of said catalytic converter and a length of said spring is expressed by a quantity indicative of said concentration of the component downstream of said catalytic converter.

16. An air-fuel control system according to claim 13, wherein said sliding mode control means has a plurality of state quantities of said exhaust system, including at least the concentration, estimated by said state predicting means, of the component of the exhaust gas downstream of said catalytic converter and a rate of change of said concentration of the component, and a predetermined linear function having said state quantities as variables, and wherein said sliding mode control means comprises:

nonlinear input calculating means for determining a correction quantity to correct the air-fuel ratio of the internal combustion engine so as to converge said state quantities onto a hyperplane represented by said linear function according to reaching and adaptive control laws of the adaptive sliding mode control process;

equivalent control input calculating means for determining a correction quantity to correct the air-fuel ratio of the internal combustion engine so as to converge said state quantities toward a balanced point on said hyperplane while converging said state quantities onto said hyperplane; and means for determining the correction quantity to correct the air-fuel ratio of the internal combustion engine by adding the correction quantities determined by said non-linear input calculating means and said equivalent control input calculating means.

17. An air-fuel control system according to claim 16, further comprising:

stability decision means for determining stability of said adaptive sliding mode control means for calculating the correction quantity to correct the air-fuel ratio of the internal combustion engine, based on a value of said linear function; and correction quantity calculation limiting means for limiting calculations of said correction quantity based on the stability determined by said stability decision means.

18. An air-fuel control system according to claim 17, wherein said correction quantity calculation limiting means comprises means for maintaining said correction quantity at a predetermined value if the calculations of said correction quantity by said adaptive sliding mode control means are determined as unstable by said stability decision means.

19. An air-fuel control system according to claim 18, wherein said predetermined value is either a latest value of said correction quantity calculated by said adaptive sliding mode control means before the calculations of said correction quantity by said adaptive sliding mode control means are determined as unstable by said stability decision means or "0".

20. An air-fuel control system according to claim 17, wherein said stability decision means comprises means for determining stability of said adaptive sliding mode control means by comparing at least one of the magnitude of a value of said linear function, the magnitude of a rate of change of the value of said linear function, and a product of the value of said linear function and the rate of change thereof with a predetermined value.

* * * * *